(12) United States Patent
Rasmussen et al.

(10) Patent No.: US 7,620,903 B1
(45) Date of Patent: Nov. 17, 2009

(54) SIMPLIFIED IMPLEMENTATION OF ADAPTABLE USER INTERFACES

(75) Inventors: Kathryn G Rasmussen, Edmonds, WA (US); Eric Askilsrud, Sammamish, WA (US); Robert E Corrington, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 559 days.

(21) Appl. No.: 10/607,665

(22) Filed: Jun. 27, 2003

(51) Int. Cl.
*G06F 3/00* (2006.01)
(52) U.S. Cl. .................. 715/762; 715/744
(58) Field of Classification Search .......... 715/744, 715/747, 760, 745, 762, 788, 789, 800
See application file for complete search history.

(56) References Cited

U.S. PATENT DOCUMENTS

| | | | |
|---|---|---|---|
| 6,801,224 B1 * | 10/2004 | Lewallen | 715/746 |
| 7,028,262 B2 * | 4/2006 | Estrada et al. | 715/751 |
| 2002/0080184 A1 * | 6/2002 | Wishoff | 345/800 |
| 2002/0089546 A1 * | 7/2002 | Kanevsky et al. | 345/800 |
| 2003/0056026 A1 * | 3/2003 | Anuff et al. | 709/316 |
| 2004/0113938 A1 * | 6/2004 | Akerfeldt | 345/738 |
| 2005/0005243 A1 * | 1/2005 | Olander et al. | 715/747 |

* cited by examiner

*Primary Examiner*—Dennis Bonshock
(74) *Attorney, Agent, or Firm*—Birch, Stewart, Kolasch & Birch, LLP

(57) ABSTRACT

Embodiments of the invention encompass a system for simplified implementation of adaptable/flexible user interfaces. The system may include: one or more frameworks; zero or more navigation modules; zero or more content modules; and a set of standardized flexible formatting specifications. The framework may include containers that zero or more navigation modules and/or content modules may be inserted into. The standardized formatting specifications may be used to specify how framework containers, and components inserted into containers, are to appear. The visual characteristics of the user interface may be changed by setting different attributes of the formatting specifications and/or inserting content and/or navigation modules into different framework containers.

19 Claims, 15 Drawing Sheets

SIMPLIFIED IMPLEMENTATION OF ADAPTABLE USER INTERFACES

TECHNICAL FIELD

Embodiments of the invention relate generally to computer user-interfaces. More particularly, the invention relates to simplified implementation of adaptable user interfaces.

BACKGROUND OF THE INVENTION

Modern development practices suggest that developers separate business logic, data, and presentation. This suggestion has helped simplify the maintenance of many user interfaces, however in practice the extent to which designers can change visuals without changing code is limited. For example, the designer may not be able to change the positioning or ordering of elements.

Typically, when user-interface designs are implemented, developers consider the desired result and write code to implement that result from scratch. When different visual appearances and/or content are desired, different Web Sites or applications are coded. Each site or application is typically implemented separately to achieve the specific result desired. Making radical changes to the appearance and/or merging sites or applications, typically involves a substantial amount of work.

Even with technologies such as Cascading Style Sheets (CSS), the result is still specific to the result being implemented. If the site or application needs to be adapted at a later date to match a different look, re-coding would likely be required.

A system that reduces the amount of work and/or pre-planning associated with making appearance changes to user interfaces, regardless of the scope of changes, would therefore be desirable.

Typically, designers and developers have to work together closely to define a set of customizable characteristics (e.g., styles) as they emerge. It would be advantageous if the developers and designers didn't have to go through this collaboration and instead could use a system that would meet their needs.

SUMMARY OF THE INVENTION

Principles in accordance with embodiments of the invention may be used to quickly and easily create, customize, and maintain many different-looking user interfaces (UIs). UI pages implemented in accordance with embodiments of the invention may advantageously provide a relatively large number of possible customizations, which may be used to easily create a variety of "looks."

In addition, the invention also allows accurate matching of the appearance of many different pre-existing user interfaces (for example Web sites) without requiring code changes to data/content. This is advantageous in situations where separate entities have formed a partnership, or where one entity is providing a single solution for multiple scenarios.

Various inventive principles are discussed below in the context of an illustrative embodiment of the invention in which one set of code may be customized to appear to be many different implementations. An illustrative embodiment of the invention provides the ability for different financial institutions to customize the visual appearance of one Web site in order to provide a customized user-experience for their clients. The appearance of the Web site may be quickly, easily, and cost-effectively customized for each financial institution.

A system in accordance with embodiments of the invention may be used to match the appearance of pre-existing financial-institution Web sites, or, if a firm has no existing Web site, the firm may specify or select from a range of customization options to create an appearance unique to their firm. Visual elements that firms may customize or choose between include: different layouts (e.g., a horizontal navigation bar near the top of the page, or a vertical navigation bar on the side of the page); colors and color combinations; graphics; fonts and font sizes; images; and table styles.

A framework, in accordance with an illustrative embodiment of the invention, may include a plurality of framework containers that zero or more navigation or content modules may be inserted into. Such a framework may be made up of a combination of containers laid out in such a manner that design flexibility is maximized. Each container may have a unique identifier, and attributes such as height, width, background color, and the like, may be determined separately by attributes of a set of standardized customization mechanisms, which may be defined in a Cascading Style Sheet (CSS) document. In this way, a single framework implementation may be made to look different by: (1) redefining the attributes specified in the CSS; and/or (2) inserting different content modules and/or different navigation modules into the framework containers.

A framework in accordance with an illustrative embodiment of the invention may adhere to any of the following characteristics: the framework may contain zero or more containers having distinct locations; each container may contain zero or more containers, which may be laid out in rows and columns; zero or more content and/or navigation modules may be inserted into a framework container; each framework container may have a unique ID; and the containers may expand or shrink to fit the module(s) that are inserted into the containers and/or the style(s) that are applied to the containers. If no module is inserted into a container, the container may: (1) shrink thereby effectively not appearing to be on the rendered page, or (2) be rendered on the page for visual reasons. Such a framework may be designed to provide a structure that can be used to provide a large variety of looks without changing how the framework is structured.

How a framework container is displayed may be defined by formatting, such as CSS styles, as opposed to being defined by the framework container itself. Formatting of this type may encompass pre-identified classes that get applied to pre-identified framework containers such that a user of a system in accordance with embodiments of the invention may set attributes of the pre-identified classes to define how the framework containers are displayed. Formatting of this type may be applied to any of the framework containers to specify that things within a framework container should be formatted in a particular way, such as left-, right-, top- or bottom-justified, centered, or the like. How the content of a container is formatted may be defined by specifying attributes of a standardized set of CSS styles.

As mentioned above, zero or more navigation modules may be inserted into various framework containers. Navigation modules may include links and selected links. Navigation modules may be laid out horizontally or vertically, or may be combined with other navigation modules. A navigation module may accommodate any reasonable number of links, and a page may accommodate any reasonable number of navigation modules.

Navigation modules, regardless of layout, may be made up of several components: a navigation module container, navigation items, which may contain navigation links; and elements that define the left and right edges of horizontal layouts, or elements that define the top and bottom edges of vertical layouts.

How navigation-module components are displayed may be defined by formatting, such as CSS styles, as opposed to being defined by the navigation-module components themselves. Formatting of this type may encompass pre-identified classes that get applied to pre-identified navigation-module components such that a user of a system in accordance with embodiments of the invention may set attributes of the pre-identified classes to define how the navigation-module components are displayed.

Since there may be a wide range of content, instead of identifying a fixed content module, the components that make up content modules may be defined and how these components are combined may be specified. Content-module components may include: headers, subheads, column heads; data; subtotals and totals; and elements used for spacing.

Content-module components may be used in various desired combinations to render particular types of data. For example, a content module may be made up of: a header and data; or a header, column headers, data, subtotals, and totals.

How content-module components are displayed may be defined by formatting, such as CSS styles, as opposed to being defined by the content-module components themselves. Formatting of this type may encompass pre-identified classes that get applied to pre-identified content-module components such that a user of a system in accordance with embodiments of the invention may set attributes of the pre-identified classes to define how the content-module components are displayed.

Additional features and advantages of the invention will be apparent upon reviewing the following detailed description.

DETAILED DESCRIPTION OF THE INVENTION

I. Exemplary Operating Environment

Aspects of the invention are suitable for use in a variety of computing system environments, including distributed computing environments. In distributed computing environments, tasks may be performed by remote computer devices that are linked through communications networks. Embodiments of the invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention will be described in the general context of computer-executable instructions, such as services, that are executed by a personal computer or a server. Generally, services may include routines, programs, objects, components, data structures, etc., that perform particular tasks or implement particular abstract data types. Typically the functionality of the services may be combined or distributed as desired in various environments.

Embodiments within the scope of the invention may also include computer readable media having executable instructions. Such computer readable media can be any available media, which can be accessed by a general purpose or special purpose computer. By way of example, and not limitation, such computer readable media can comprise RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
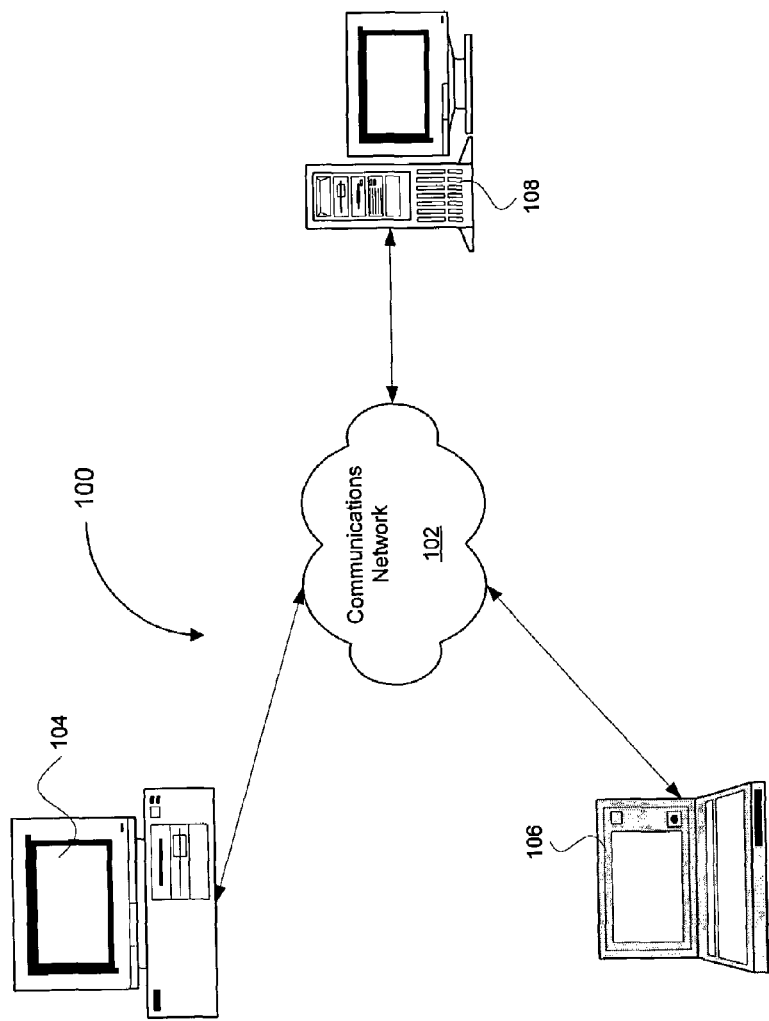
FIG. 1 is a schematic block diagram of a conventional distributed general-purpose digital computing environment that can be used to implement various aspects of the invention.

FIG. 1 illustrates an example of a suitable distributed computing system 100 operating environment in which the invention may be implemented. Distributed computing system 100 is only one example of a suitable operating environment and is not intended to suggest any limitation as to the scope of use or functionality of the invention. System 100 is shown as including a communications network 102. The specific network implementation used can comprise, for example, any type of local area network (LAN) and associated LAN topologies and protocols; simple point-to-point networks (such as direct modem-to-modem connection); and wide area network (WAN) implementations, including public Internets and commercial based network services. Systems may also include more than one communication network, such as a LAN coupled to the Internet.

Computer device 104, computer device 106, and computer device 108 may be coupled to communications network 102 through communication devices. Network interfaces or adapters may be used to connect computer devices 104, 106, and 108 to a LAN. When communications network 102 includes a WAN, modems or other means for establishing communications over WANs may be utilized. Computer devices 104, 106 and 108 may communicate with one another via communication network 102 in ways that are well known in the art. The existence of any of various well-known protocols, such as TCP/IP, Ethernet, FTP, HTTP and the like, is presumed. Communications network 102 may be wired, wireless, or a combination of wired and wireless.

Computer devices 104, 106 and 108 may exchange content, applications, messages and other objects via communications network 102. In some aspects of the invention, computer device 108 may be implemented with a server computer or server farm. Computer device 108 may also be configured to provide services to computer devices 104 and 106. Alternatively, computing devices 104, 106, and 108 may also be arranged in a peer-to-peer arrangement in which, for a given operation, ad-hoc relationships among the computing devices may be formed.

II. Introduction

Figure 2:
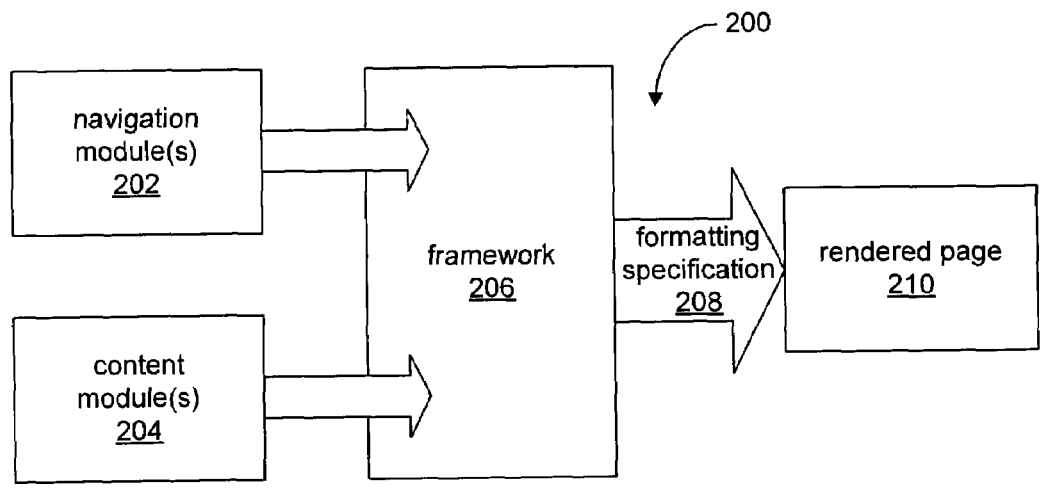
FIG. 2 is a schematic block diagram showing zero or more navigation modules and zero or more content modules being inserted into a framework and formatting specification then being applied to produce a rendered user-interface page in accordance with an illustrative embodiment of the invention.

Referring to FIG. 2, an extensible system 200, in accordance with an illustrative embodiment of the invention, is shown. The system 200 may include: a flexible framework 206; zero or more navigation modules 202; zero or more content modules 204; and formatting specification 208 that defines visual characteristic of various parts of a rendered user interface (UI).

Various inventive principles will be discussed in the context of an illustrative embodiment of a system designed so that one set of reusable code may be customized to appear to be many different implementations. An illustrative embodiment of the invention provides the ability for different financial institutions to customize the visual appearance of one Web site in order to provide a customized user-experience for their clients. The appearance of the Web site may be quickly, easily, and cost-effectively customized for each financial institution. A system in accordance with embodiments of the invention may be used to match the appearance of pre-existing financial-institution Web sites, or a firm may define or select from a range of customization options to create a different appearance unique to their firm. Visual elements that firms may customize or choose between include, but are not limited to: different layouts (e.g., a horizontal navigation bar near the top of the page, or a vertical navigation bar on the side of the page); colors and color combinations; graphics; fonts and font sizes; images; and table styles.

As will be apparent, embodiments of the invention may be used for creating various types of user interfaces, such as user interfaces for browser-based implementations, including Intranets, browser-based CD demos, web applications, and the like. User interfaces in accordance with embodiments of the invention may contain various types of content, including content other than for financial institutions.

The formatting specification 208 may specify a set of standardized attributes in a Cascading Style Sheet (CSS) document. The classes should be reusable such that they may be used for a variety of scenarios that typically are not conventionally contemplated. For instance, there are styles available to specify decorative elements to locations that are not typically available on user interfaces, such as Web sites.

Formatting specification 208 may encompass a customization specification and/or a configuration file, which may programmatically specify that particular modules should be inserted into particular framework containers. Such a configuration file may be edited via a tool rather than thru a text editor.

II.A. Examples of Types of User Interfaces that May be Implemented in Accordance with Embodiments of the Invention In accordance with embodiments of the invention, a single firm may produce a Web site that other firms can re-brand. Then, various organizations, such as financial institutions, may present the Web site as their own by customizing CSS style definitions and/or attribute settings.

A somewhat opposite scenario is also possible in which an organization has its own Web site and wants to add just a single module from another Web site. If both Web sites are implemented in accordance with embodiments of the invention, then the organization could insert the desired module into its Web site (either dynamically or manually) and the visuals of the inserted module will automatically match the rest of the site.

When Web sites in accordance with various inventive principles are widely implemented, sharing content between sites is more easily facilitated, thereby making it easier to sell or redistribute content. Page formatting and visual differences would be non-issues, because they would adhere to a standardized framework that provides flexibility.

Federated sites are an example in which different sites share a single look. For instance, geographically dispersed hobby enthusiasts may maintain their own content on separate servers and, in accordance with various inventive principles, their Web sites could point to a common configuration file, which would cause the Web sites to share a common look. If each of the federated Web sites uses such a system, then the look can be drastically changed for substantially all of the federated sites simply by changing centralized configuration file(s). The federated sites would not need to devise a CSS guideline as is conventionally done, and they could go beyond the customizations possible with just CSS.

A similar system in accordance with embodiments of the invention could be offered to different groups of users. For example, one host could maintain a single system that would provide a solution such as chat rooms or t-shirt stores to potentially federated sites for a range of interests, like cooking enthusiasts, hikers and trapeze artists. Each enthusiast group could have a unique visual look that could be separately, potentially externally, described/maintained without code changes by the host.

User interface development can be streamlined. For instance, a freelance Web-site developer could start in accordance with various inventive principles for each site developed rather than starting from scratch. With this system, the developer can be confident that he can later change the look of any of these sites, or adapt them to additional customers/scenarios, by changing appropriate configuration settings. Graphic designers can also work in parallel with code developers.

User interfaces developed in accordance with various inventive principles could establish an industry standard. The industry standard could do things like help Web sites merge and integrate more easily. For instance, if the banking industry implemented Web sites in accordance with embodiments of the invention, a parent bank could have different CSS attribute settings for institutions within its corporate family. If one chain of banks was absorbed into another chain of banks, changing the visual appearance of the absorbed chain's Web site would be a matter of referencing the other bank's CSS document. Similarly, changing the visual appearance of a regional bank, which was purchased by the parent bank, could be accomplished by applying the CSS attribute settings from the parent bank's Web site.

III. Framework

Figure 3:
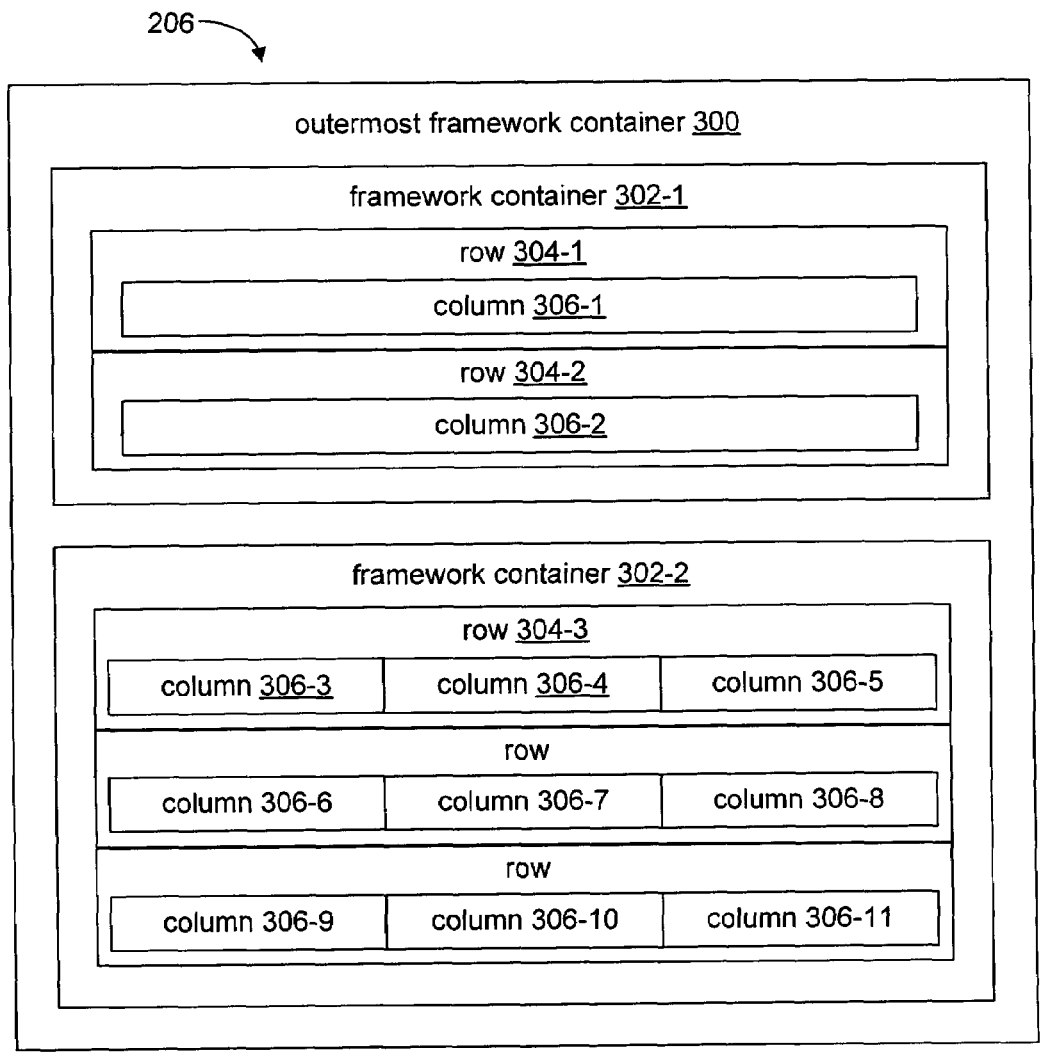
FIG. 3 is a schematic block diagram of a framework in accordance with an illustrative embodiment of the invention.

Referring to FIG. 3, a framework 206, in accordance with an illustrative embodiment of the invention, may include a plurality of framework containers (e.g., framework containers 302-1 and 302-2) that zero or more navigation modules 202 or content modules 204 may be inserted into. Such a framework 206 may be made up of a combination of containers 302 laid out in such a manner that design flexibility is maximized. Each container 302 may have a unique identifier, and attributes such as height, width, background color, and the like, may be determined separately in formatting specification 208 by attributes of a set of standardized flexible styles, which may be contained in a Cascading Style Sheet document and/or other configuration file. In this way, a single framework implementation may be made to look different by: (1) redefining the attributes specified in the CSS; and/or (2) inserting different content modules 204 and/or different navigation modules 202 into the framework 206.

A framework 206 in accordance with an illustrative embodiment of the invention may adhere to any of the following characteristics: the framework may contain zero or more containers 302 having distinct locations; each container 302 may contain zero or more containers 302, which may be laid out in rows 304 and columns 306; zero or more content and/or navigation modules may be inserted into a framework container 302; each framework container may have a unique ID; and the containers may expand or shrink to fit the module(s) that are inserted into the containers and/or the style(s) that are applied to the containers. If no module is inserted into a container, the container may: (1) shrink thereby effectively not appearing to be on the rendered page, or (2) be rendered on the page for visual reasons. A framework 206 may be designed to provide a structure that can be used to provide a large variety of looks without changing how the framework is structured.

Figure 10:
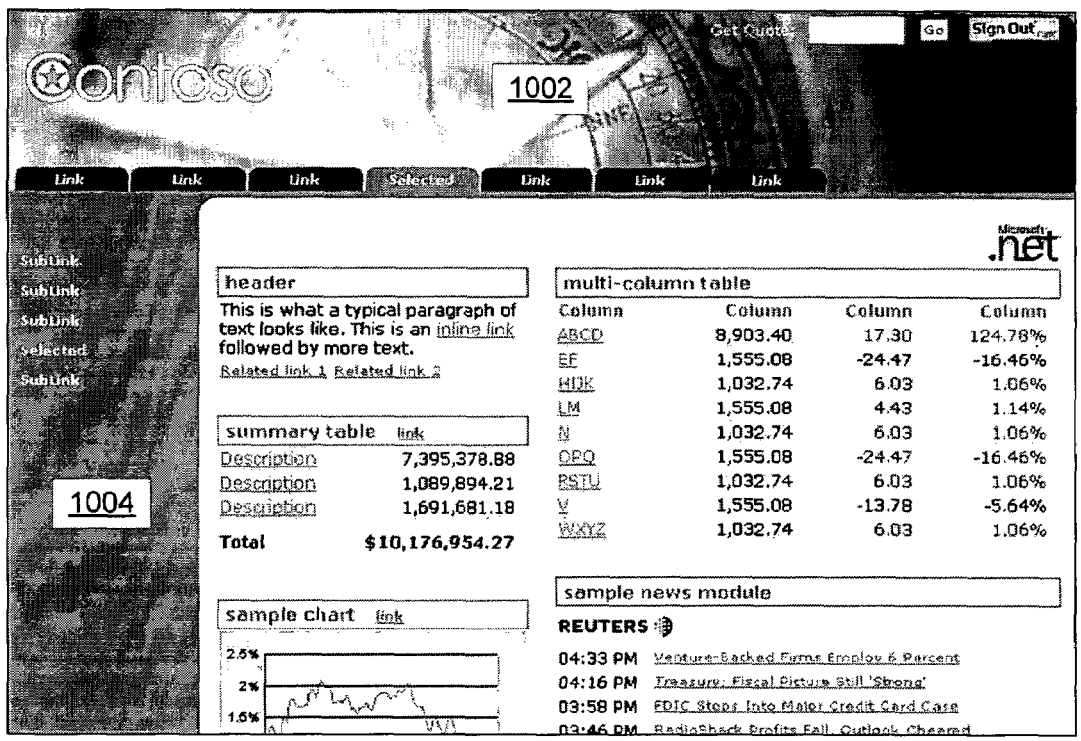
FIGS. 10 through 13 are screenshots of the same page rendered in FIG. 9 but with different visual characteristics due to different formatting specification being applied to the content modules, navigation modules, and framework.
Figure 11:
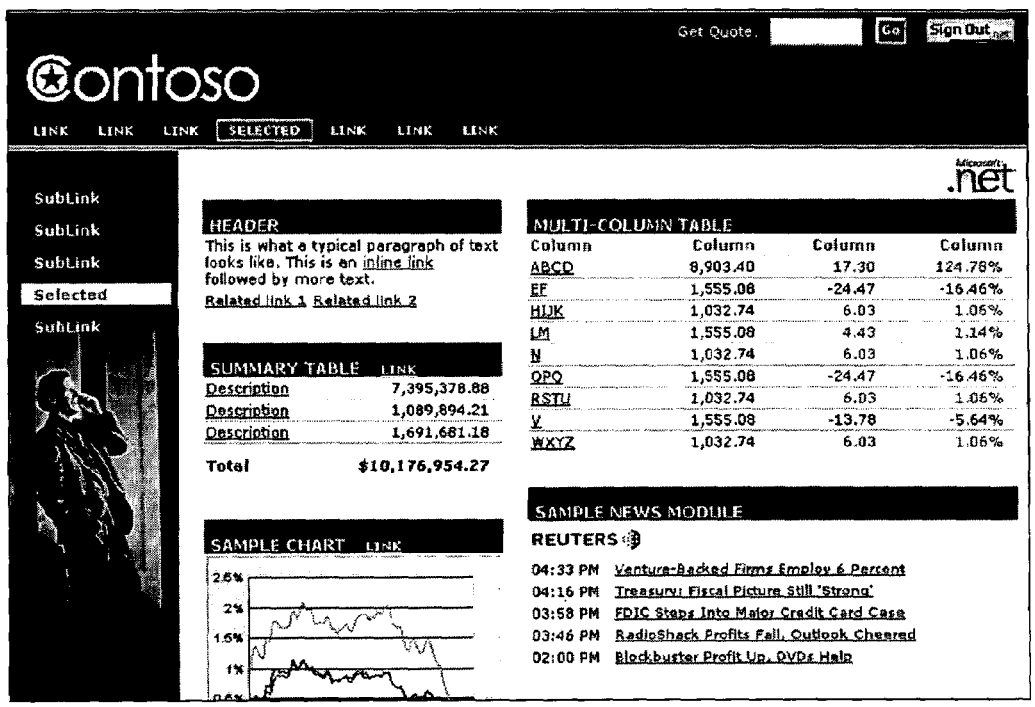
Figure 12:
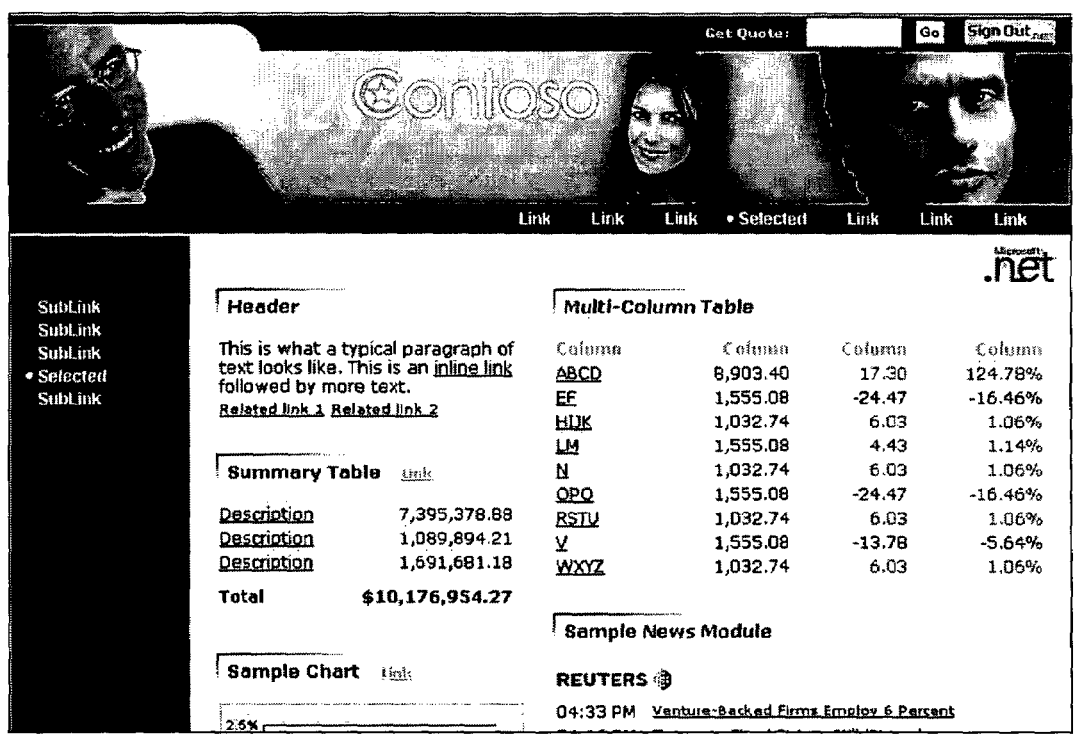
Figure 13:
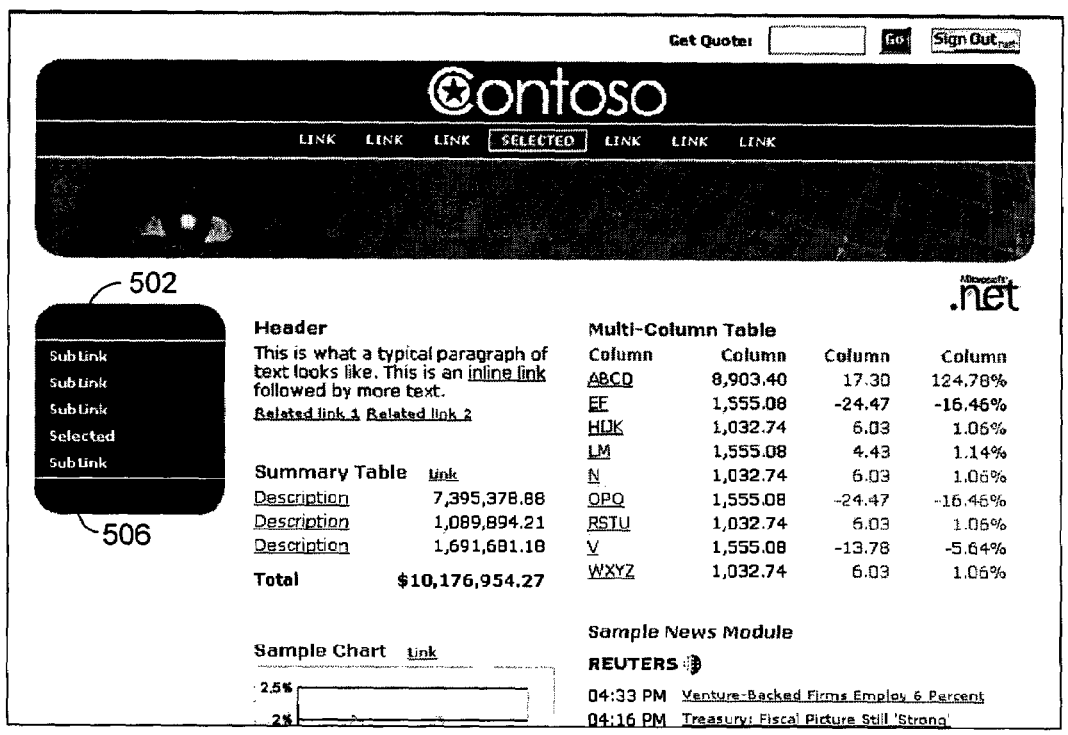

Referring to FIG. 13, particular instances are depicted of navigation module top 502 (FIG. 5) and navigation module bottom 506 as rendered to a page. In FIGS. 10-12, these module components are not visually apparent.

Formatting specification 208, which is discussed in more detail below, may be applied to any of the framework containers (e.g., main framework container 300 and framework container 302-1 and 302-2) to specify that contents should be formatted in a particular way, such as left-justified, right-justified, top-justified, bottom-justified, centered, or the like. How the content of a framework container is formatted may be defined by the formatting specification 208. In this way, and as a result of the flexible, anticipatory way in which framework 206 is structured, a system in accordance with the invention advantageously provides a lot of flexibility and simplification with respect to changing the visual appearance of a user interface, such as a set of web pages.

Referring to FIG. 3, a framework 206, in accordance with an illustrative embodiment of the invention, comprises an outermost framework container 300, which is made up of two framework containers 302-1 and 302-2. Both containers 302 are made up of rows 304, which may be referred to as skin rows, and columns 306, which each may have unique identifiers.

Figure 8:
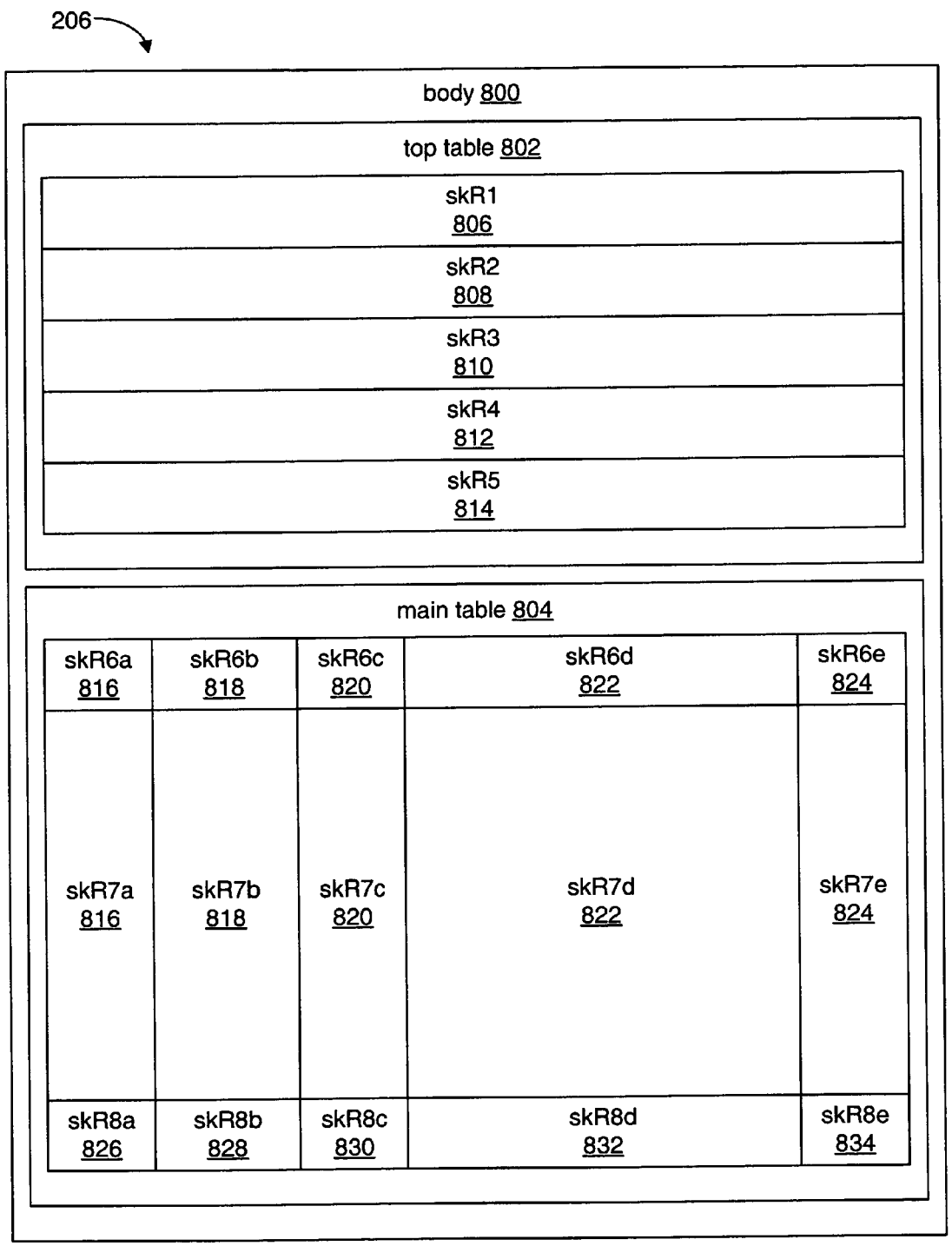
FIG. 8 is a schematic block diagram of a framework in accordance with an illustrative embodiment of the invention.

FIG. 8 depicts an illustrative embodiment of a framework 206. As will be apparent, a framework in accordance with various embodiments of the invention may be structured in suitable ways other than those shown in FIGS. 8 and 3. The framework 206 of FIG. 8 may be used for generating, among many others, the user-interface pages shown in FIGS. 10-13.

III.A. Top Table

Referring to FIG. 8, the top table 802 is made up of five rows: (1) Skin Row 1 (skR1) 806 may contain a navigation module 202; (2) Skin Row 2 (skR2) 808 may contain a firm name and/or logo; (3) Skin Row 3 (skR3) 810 may be used primarily for spacing, and may contain a 1 pixel by 1 pixel transparent spacer gif, for example; (4) Skin Row 4 (skR4) 812 may contain another navigation module 202 in some navigation layouts; and (5) Skin Row 5 (skR5) 814 may be used primarily for spacing or for navigation.

III.B. Main Table

A main table 804 may be made up of 3 rows: (1) Skin Row 6 (comprising skR6*a* 816, skR6*b* 818, skR6*c* 820, skR6*d* 822, skR6*e* 824) may be used for spacing or decoration; (2) Skin Row 7 (skR7*a* 816 through skR7*e* 824) may contain content, and in some cases, navigation or decoration; and (3) Skin Row 8 (skR8*a* 826 through skR8*e* 834) may be used for spacing or decoration.

With respect to Skin Row 7, column A (skR7*a* 816) may be used for spacing or decoration; Column B (skR7*b* 818) may contain decoration or a navigation module 202; Column C (skR7*c* 820) may be used for spacing or decoration; Column D (skR7*d* 822) may contain decoration or a content module; and Column E (skR7*e* 824) may be used for spacing or decoration.

III.C. Sample Framework Code

The following Hypertext Markup Language (HTML) sample may be used to implement a framework 206 of the type depicted in FIG. 8.

```
<!DOCTYPE HTML PUBLIC "-//W3C//DTD HTML 4.01 Transitional//EN"
"http://www.w3.org/TR/html4/loose.dtd">
<html>
<head>
    <title>Sample 1</title>
    <link rel="stylesheet" type="text/css" href="style.css" />
</head>
<body>
<table border="0" cellpadding="0" cellspacing="0" width="100%" id="topTable">
    <tr>
        <td valign="top" id="skR1"><img src="images/spacer.gif" width="1" height="1" border="0" /></td>
    </tr>
    <tr>
        <td valign="top" id="skR2">
            <div id="logo">
                <a href="url.html" class="logoLink">Firm Name</a>
            </div>
        </td>
    </tr>
    <tr>
        <td valign="top" id="skR3">
            <img src="images/spacer.gif" width="1" height="1" border="0" />
        </td>
    </tr>
    <tr>
        <td valign="middle" id="skR4">
            <img src="images/spacer.gif" width="1" height="1"
```

-continued

```
border="0" />
    /td>
  </tr>
  <tr>
    <td valign="top" id="skR5">
      <img src="images/spacer.gif" width="1" height="1"
border="0" />
    </td>
  </tr>
</table>
<table border="0" cellpadding="0" cellspacing="0" width="100%"
id="mainTable">
  <tr>
    <td valign="top" id="skR6a"><div class="widthA"><img
src="images/spacer.gif" width="1" height="1" border="0" /></div></td>
    <td valign="top" id="skR6b"><div class="widthB"><img
src="images/spacer.gif" width="1" height="1" border="0" /></div></td>
    <td valign="top" id="skR6c"><div class="widthC"><img
src="images/spacer.gif" width="1" height="1" border="0" /></div></td>
    <td valign="top" id="skR6d"><div class="widthD"><img
src="images/spacer.gif" width="1" height="1" border="0" /></div></td>
    <td valign="top" id="skR6e"><div class="widthE"><img
src="images/spacer.gif" width="1" height="1" border="0" /></div></td>
  </tr>
  <tr>
    <td valign="top" id="skR7a"><div class="widthA"><img
src="images/spacer.gif" width="1" height="1" border="0" /></div></td>
    <td valign="top" id="skR7b"><div class="widthB"><img
src="images/spacer.gif" width="1" height="1" border="0" /></div></td>
    <td valign="top" id="skR7c"><div class="widthC"><img
src="images/spacer.gif" width="1" height="1" border="0" /></div></td>
    <td valign="top" id="skR7d"><div class="widthD"><img
src="images/spacer.gif" width="1" height="1" border="0" /></div></td>
    <td valign="top" id="skR7e"><div class="widthE"><img
src="images/spacer.gif" width="1" height"1" border="0" /></div></td>
  </tr>
  <tr>
    <td valign="top" id="skR8a"><div class="widthA"><img
src="images/spacer.gif" width="1" height="1" border="0" /></div></td>
    <td valign="top" id="skR8b"><div class="widthB"><img
src="images/spacer.gif" width="1" height="1" border="0" /></div></td>
    <td valign="top" id="skR8c"><div class="widthC"><img
src="images/spacer.gif" width="1" height="1" border="0" /></div></td>
    <td valign="top" id="skR8d"><div class="widthD"><img
src="images/spacer.gif" width="1" height="1" border="0" /></div></td>
    <td valign="top" id="skR8e"><div class="widthE"><img
src="images/spacer.gif" width="1" height="1" border="0" /></div></td>
  </tr>
</table>
</body>
</html>
```

The HTML samples provided in this document may be generated by code that inserts dynamic content into appropriate slots.

IV. Navigation Modules

Navigation modules 202 may be made up of links, selected links, and spaces around the links. Navigation modules may be laid out horizontally or vertically, or may be combined with other navigation modules 202. A navigation module may accommodate any reasonable number of links, and a page may accommodate any reasonable number of navigation modules 202.

Navigation modules may be inserted into a desired framework container. Formatting specification 208 may be used for specifying visual characteristics that may be selectively applied to navigation modules 202.

Figure 4:
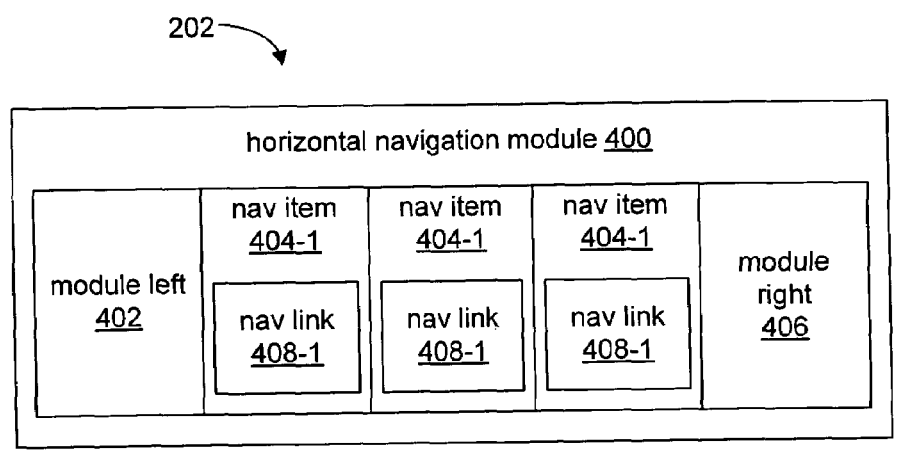
FIG. 4 is a schematic block diagram of a navigation module with a horizontal layout in accordance with an illustrative embodiment of the invention.
Figures 5, 6:
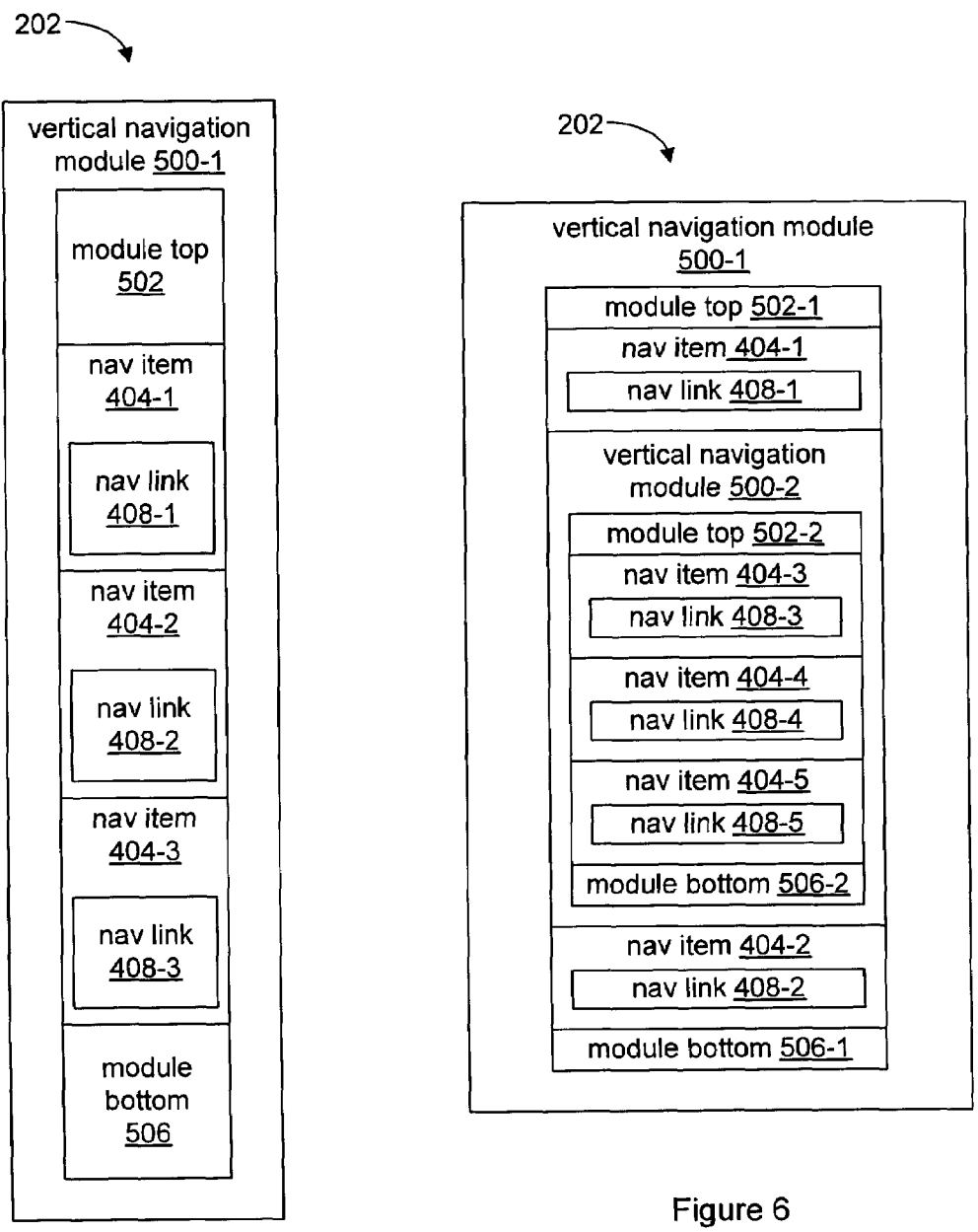
FIG. 5 is a schematic block diagram of a navigation module with a vertical layout in accordance with an illustrative embodiment of the invention.
FIG. 6 is a schematic block diagram of a navigation module with a vertical layout within another navigation module with a vertical layout in accordance with an illustrative embodiment of the invention.

FIGS. 4-6 are schematic block diagrams of a horizontal navigation module 400, a vertical navigation module 500, and a vertical navigation module 500-2 within another vertical navigation module 500-1, in accordance with an illustrative embodiment of the invention.

Referring to FIGS. 4-6, navigation modules 202, regardless of layout, may be made up of several components: a navigation module container; navigation items 404, which may contain navigation links 408; elements 402 and 406 that define the left and right edges of horizontal layouts, or elements 502 and 506 that define the top and bottom edges of vertical layouts.

The following HTML sample may be used for implementing a horizontal navigation module 400 of the type depicted in FIG. 4.

```
<div class="nav">
  <table border="0" cellpadding="0" cellspacing="0">
    <tr>
      <td class="navL"><img src="images/spacer.gif" width="1"
height="1" border="0"></td>
      <td><div class="navitem"><a href=" "
class="navlink">Link</a></div></td>
      <td><div class="navitem"><a href=" "
class="navlink">Link</a></div></td>
      <td><div class="navitem"><a href=" "
class="navlink">Link</a></div></td>
      <td><div class="navitemsel"><a href=" "
class="navlinksel">Selected</a></div></td>
      <td><div class="navitem"><a href=" "
class="navlink">Link</a></div></td>
      <td><div class="navitem"><a href=" "
class="navlink">Link</a></div></td>
      <td><div class="navitem"><a href=" "
class="navlink">Link</a></div></td>
      <td class="navR"><img src="images/spacer.gif" width="1"
height="1" border="0"></td>
    </tr>
  </table>
</div>
```

The following HTML sample may be used for implementing a vertical navigation module 500 of the type depicted in FIG. 5.

```
<div class="nav">
  <div class="navT"><img src=images/spacer.gif" width="1" height="1"
border="0"></div>
  <div class="navitem"><a class="navlink" href=" ">Link</a></div>
  <div class="navitem"><a class="navlink" href=" ">Link</a></div>
  <div class="navitem"><a class="navlink" href=" ">Link</a></div>
  <div class="navitemsel"><a class="navlinksel"
href=" ">Selected</a></div>
  <div class="navitem"><a class="navlink" href=" ">Link</a></div>
  <div class="navB"><img src="images/spacer.gif" width="1"
height="1" border="0"></div>
</div>
```

The following HTML sample may be used for implementing a vertical navigation module 500 within another vertical navigation module 500 in a manner similar to the nested vertical navigation modules depicted in FIG. 5.

```
<div class="nav">
  <div class="navT"><img src="images/spacer.gif" width="1"
height="1" border="0"></div>
  <div class="navitem"><a href=" " class="navlink">Link</a></div>
  <div class="navitem"><a href=" " class="navlink">Link</a></div>
  <div class="navitemsel"><a href=" "
class=37 navlinksel">Selected</a></div>
  <div class="snavsel">
    <div class="snavitem"><a class="snavlink"
href=" ">SubLink</a></div>
    <div class="snavitem"><a class="snavlink"
```

-continued

```
href=" ">SubLink</a></div>
    <div class="snavitemsel"><a class="snavlinksel"
href=" ">Selected</a></div>
    <div class="snavitem"><a class="snavlink"
href=" ">SubLink</a></div>
  </div>
  <div class="navitem"><a href=" " class="navlink">Link</a></div>
  <div class="snav">
    <div class="snavitem"><a class="snavlink"
href=" ">SubLink</a></div>
    <div class="snavitem"><a class="snavlink"
href=" ">SubLink</a></div>
    <div class="snavitem"><a class="snavlink"
href=" ">SubLink</a></div>
    <div class="snavitem"><a class="snavlink"
href=" ">Selected</a></div>
    <div class="snavitem"><a class="snavlink"
href=" ">SubLink</a></div>
  </div>
  <div class="navitem"><a href=" " class="navlink">Link</a></div>
  <div class="snav">
    <div class="snavitem"><a class="snavlink"
href=" ">SubLink</a></div>
    <div class="snavitem"><a class="snavlink"
href=" ">SubLink</a></div>
    <div class="snavitem"><a class="snavlink"
href=" ">SubLink</a></div>
    <div class="snavitem"><a class="snavlink"
href=" ">Selected</a></div>
    <div class="snavitem"><a class="snavlink"
href=" ">SubLink</a></div>
  </div>
  <div class="navitem"><a href=" " class="navlink">Link</a></div>
  <div class="navB"><img src="images/spacer.gif" width="1"
height="1" border="0"></div>
</div>
```

V. Content Modules

Figure 7:
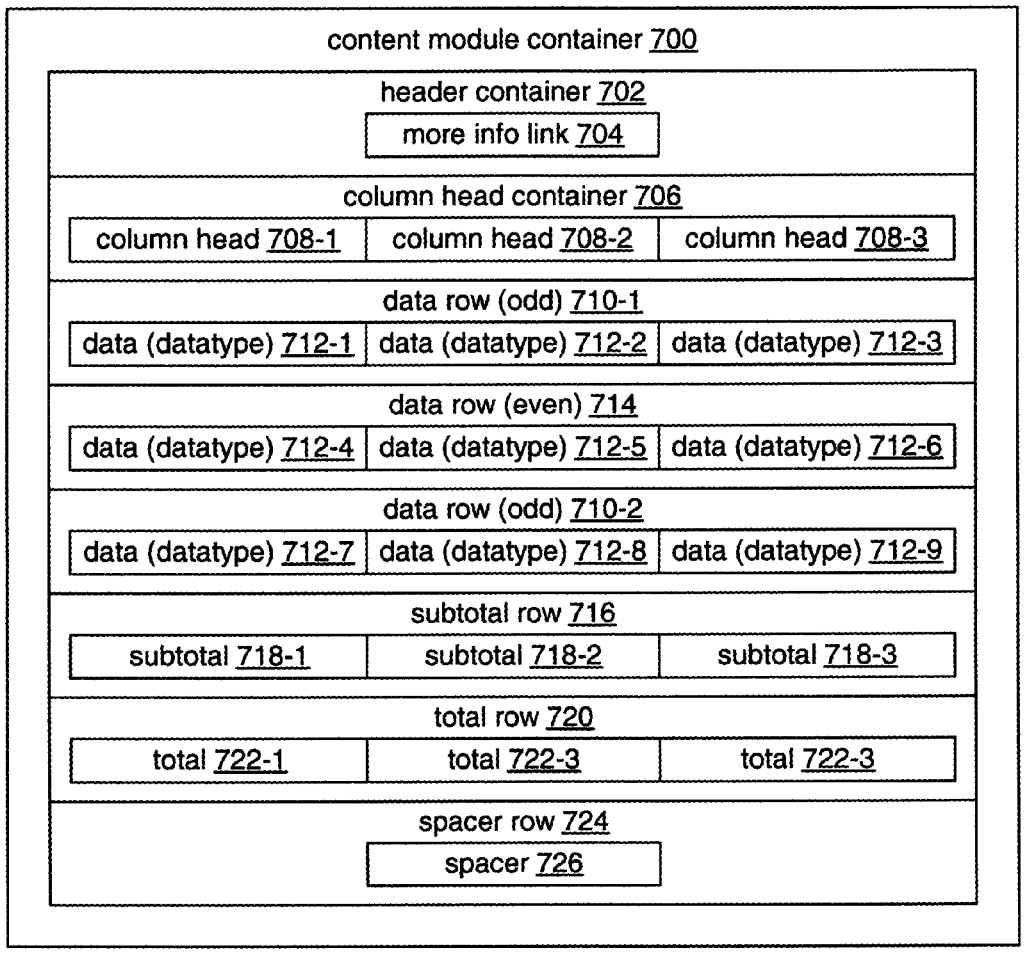
FIG. 7 is a schematic block diagram of a content module in accordance with an illustrative embodiment of the invention.

Content module sub-components may include: headers, subheads, column heads; data; subtotals and totals; footers; forms and form controls; and elements used for spacing. FIG. 7 is a schematic block diagram of a content module 204 in accordance with an illustrative embodiment of the invention. A content module 204 may be inserted into a desired framework container 302. For ease of implementation, a predetermined subset of framework containers 302 may be designated as the only available locations for content modules 204 within a framework 206. Content-module components may be used in various desired combinations to render particular types of data. For example, a content module may be made up of: (1) a header 702 and data 712; or (2) a header 702, column headers 708, data 712, subtotals 718, and totals 722.

An example of a content module on a financial Web site may be a news module, a stock quote area, a chart, a table, and the like. A content module may include various types of components, including for instance, a module header 702. FIGS. 9-13 show headers 902-1 through 902-5 with no formatting specification applied in FIG. 9 and with differing formatting specification applied in FIGS. 10-13. The differing appearances of the module headers in FIGS. 10-13 is generated by differing header-style attributes in formatting specification 208 that are applied to the common set of content modules shown in FIG. 9.

The following HTML sample shows code for unformatted content including a header and text.

```
<table border="0" cellpadding="2" cellspacing="0" width="100%">
  <tr class="headerRow">
    <td colspan="2" class="header">Header</td>
  </tr>
  <tr class="descRow">
    <td colspan="2" class="desc">Description. Lorem ipsum dolor sit
amet, consectetuer adipiscing elit, sed diem nonummy nibh euismod
tincidunt ut lacreet dolore magna aliguam erat volutpat. Ut wisis
enim ad minim veniam, quis nostrud exerci tution ullam corper
suscipit lobortis nisi ut aliquip ex ea commodo consequat. Duis te
feugi facilisi. Duis autem dolor in hendrerit in vulputate velit esse
molestie consequat, vel illum dolore eu feugiat nulla facilisis at
vero eros et accumsan et iusto odio dignissim qui blandit praesent
luptatum zzril delenit au gue duis dolore te feugat nulla
facilisi.</td>
  </tr>
</table>
<div class="mspacer"><img src="spacer.gif" width="1" height="1"
border="0" /></div>
```

The following HTML sample shows code for unformatted content in the form of a multi-column table of data. The unformatted content includes a header, text, column headers, a subhead, even and odd rows of data, subtotals, and totals.

```
<table border="0" cellpadding="2" cellspacing="0" width="100%">
  <tr class="headerRow">
    <td colspan="2" class="header">Header</td>
  </tr>
  <tr class="descRow">
    <td colspan="2" class="desc">Description. Lorem ipsum dolor sit
amet, consectetuer adipiscing elit, sed diem nonumxny nibh.</td>
  </tr>
  <tr class="colheadRow">
    <th valign="top" align="left" class="colhead">Column header</th>
    <th valign="top" align="right" nowrap="nowrap"
class="colhead">Column header</th>
  </tr>
  <tr class="subheadRow">
    <td colspan="2" class="subhead">Subhead</td>
  </tr>
  <tr class="datarowOdd">
    <td valign="top" align="left" class="neutral">Data</td>
    <td valign="top" align="right" class="positive">Data</td>
  </tr>
  <tr class=datarowEven">
    <td valign="top" align="left" class="neutral">Data</td>
    <td valign="top" align="right" class="positive">Data</td>
  </tr>
  <tr class="datarowOdd">
    <td valign="top" align="left" class="neutral">Data</td>
    <td valign="top" align="right" class="positive">Data</td>
  </tr>
  <tr class="datarowEven">
    <td valign="top" align="left" class="neutral">Data</td>
    <td valign="top" align="right" class="positive">Data</td>
  </tr>
  <tr class="subtotalRow">
    <td valign="top" align="left" class="neutral">Subtotal</td>
    <td valign="top" align="right" class="positive">Subtotal</td>
  </tr>
  <tr class="spacerRow">
    <td valign="top" colspan="2" class="spacer"></td>
  </tr>
  <tr class="subheadRow">
    <td colspan="2" class="subhead">Subhead</td>
  </tr>
  <tr class="datarowOdd">
    <td valign="top" align="left" class="neutral">Data</td>
    <td valign="top" align="right" class="positive">Data</td>
  </tr>
  <tr class="datarowEven">
    <td valign="top" align="left" class="neutral">Data</td>
    <td valign="top" align="right" class="positive">Data</td>
```

-continued

```
</tr>
<tr class="datarowOdd">
    <td valign="top" align="left" class="neutral">Data</td>
    <td valign="top" align="right" class="positive">Data</td>
</tr>
<tr class="datarowEven">
    <td valign="top" align="left" class="neutral">Data</td>
    <td valign="top" align="right" class="positive">Data</td>
</tr>
<tr class=datarowOdd">
    <td valign="top" align="left" class="neutral">Data</td>
    <td valign="top" align="right" class="positive">Data</td>
</tr>
<tr class="subtotalRow">
    <td valign="top" align="left" class="neutral">Subtotal</td>
    <td valign="top" align="right" class="positive">Subtotal</td>
</tr>
<tr class="spacerRow">
    <td valign="top" colspan="2" class="spacer"></td>
</tr>
<tr class="totalRow">
    <td valign="top" align="left" class="neutral">Total</td>
    <td valign="top" align="right" class="positive">Total</td>
</tr>
<tr class="closerRow">
    <td valign="top" colspan="2" class="tcloser"></td>
</tr>
</table>
<div class="mspacer"><img src="spacer.gif" width="1" height="1" border="0" /></div>
```

VI. Formatting Specification

Formatting specification, such as a set of standardized flexible CSS styles, may be used to define the respective appearances of elements (such as navigation modules 202, content modules 204, items within such modules, and framework containers 302) within a framework 206. Visual characteristics that may be specified by the formatting specification may include, among others: color; heights, widths, spacing around an element, spacing within an element; background images; borders (whether they are present on the top, bottom, left, or right, how wide they are, what color they are, whether they are solid, dotted, inset, and the like); and fonts (including font families, sizes, styles, whether text is uppercase or lowercase, whether it is underlined, spacing between letters, spacing between lines, and the like).

In accordance with an illustrative embodiment of the invention, the application of a representative sample of CSS styles to a navigation module 202 will now be discussed. As will be apparent, additional and/or other suitable styles may also be applied to a navigation module 202.

.nav is the container for the navbar. It defines how the space containing the navigation appears.

.navitem is the space that contains nav links.

.navitemsel is the space that contains the selected nav link.

.navlink, A.navlink:visited, A.navlink:hover are used to format the text that makes up a nav link.

.navlinksel, A.navlinksel:visited, A.navlinksel:hover are used to format the text for the selected nav link.

.navT is a space at the top edge of vertical navbars

.navB is a space at the bottom edge of vertical navbars.

.navL is a space at the left edge of horizontal navbars.

.navR is a space at the right edge of horizontal navbars.

In accordance with an illustrative embodiment of the invention, the application of a representative sample of CSS styles to content will now be discussed. As will be apparent additional and/or other suitable styles may also be applied to content.

.contentTable is the container for a content module.

.headerRow is the row that contains the table header.

.header is the table header.

.more is for summary module links to more information.

.descRow is the row that contains the description.

.desc is a description of the contents of a table.

.colheadRow is the row that contains the column headers.

.colhead is a column header.

.subheadRow is the row that contains subhead(s)—typically used to group data within a table.

.dataRow is used for rows in a table that are not designated even or odd.

.datarowOdd is used for odd rows in a table.

.datarowEven is used for even rows in a table.

.subtotalRow is the row that contains subtotal(s).

.totalRow is the row that contains total(s).

.spacerRow is used for rows that contains spacer(s).

.spacer is a placeholder used solely for spacing. Contains a 1 pixel (px) transparent gif.

.closerRow is the row that closes a table, and contains tcloser(s).

.tcloser is a placeholder used to close a table. Contains a transparent 1 px spacer gif.

.mspacer is a placeholder used to create the space between modules. Contains a 1 px transparent gif.

.neutral is a data-type for text strings and neutral values.

.positive is a data-type for positive values.

.negative is a data-type for negative values.

.moveUp, .moveDown, and .moveUnch are data types for positive growth, negative change, and no change.

.button is for generic buttons.

.btnFixed is used for fixed-width buttons (used where two or more buttons are shown together).

.btnGo is used for "Go" buttons.

Figure 9:
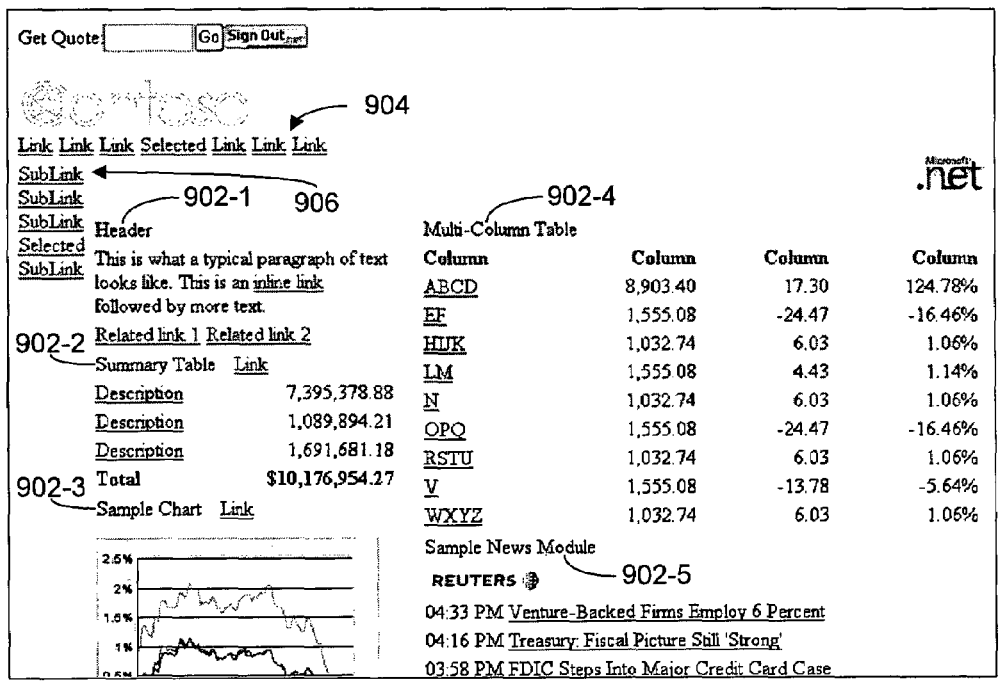
FIG. 9 is a screenshot of content modules and navigation modules inserted into the framework of FIG. 8 without any formatting specification applied.

FIG. 9 is a screenshot of content modules 204 and navigation modules 202 inserted into the framework of FIG. 8 without any formatting specification 208 applied. FIGS. 10 through 13 are screenshots of rendered pages that have different visual characteristics due to different formatting specification being applied to the content modules, navigation modules, and framework, as depicted in FIG. 9. For instance, primary navigation module 904 and secondary navigation module 906 have different visual characteristics applied to them in FIGS. 10-13. In FIG. 10, navigation links with primary navigation module 904 appear as tabs. And in FIGS. 10-13 selected links within the navigation modules are highlighted in various ways. In FIG. 10, the even rows and odd rows of the tables are shaded differently to make reading the tables easier. This type of row shading is not present in FIGS. 11-13. Finally, areas 1002 and 1004 have different images and visual characteristics applied to them in FIGS. 10-13, including the module top 502 and module bottom 506, as rendered, in FIG. 13. These navigation-module components are not present in FIGS. 10-12.

FIGS. 14-17 are screenshots of the following sample CSS style definitions and attribute settings applied to a framework and to various navigation modules and content modules inserted into the framework HTML sample provided above.

```
<!--
/*** FRAMEWORK ***/
BODY {margin: 0px; height: 100%;}
#topTable    {background-image: url (images/teal_compass.jpg);
background-repeat: no-repeat; width: 780px; background-color:
#ffffff;}
```

-continued

```
#skR1         {height: 26px;}
#skR2         {height: 60px; vertical-align: middle;}
#logo         {width: 300px; height: 75px; margin-left: 10px; font-
              family: impact, sans-serif; font-size: 22px; color: #ffffff;}
A.logoLink {font-family: impact, sans-serif; font-size: 22px; color:
#ffffff; text-decoration: none;}
A.logoLink:visited {color: #ffffff; text-decoration: none;}
A.logoLink:hover {color: #ffffff; text-decoration: none;}
#skR3         { }
#skR4         { }
#skR5         {height: 5px; background-color: #999966;}
#mainTable    {width: 780px; height: 100%; background-color: #ffffff;}
#skR6a        {width: 10px; background-color: #999966;}
#skR7a        {width: 10px; background-color: #999966;}
#skR8a        {width: 10px; background-color: #999966;}
.widthA       {width: 10px;}
#skR6b        {width: 130px; background-color: #999966;}
#skR7b        {width: 130px; background-color: #999966;}
#skR8b        {width: 130px; background-color: #999966;}
.widthB       {width: 130px;}
#skR6c        {width: 13px; height: 13px; background-image:
url(images/smCircleTL.gif); background-repeat: no-repeat; background-
color: #999966;)
#skR7c        {width: 13px;}
#skR8c        {width: 13px;}
.widthC       {width: 13px;}
#skR6d        { }
#skR7d        { }
#skR8d        { }
.widthD       { }
#skR6e        {width: 20px;}
#skR7e        {width: 20px; height: 100%;}
#skR8e        {width: 20px;}
.widthE       {width: 20px;}
/*** NAV ***/
.mnav                            { }
/* global nav */
.gnav                            {text-align: right; margin-right: 10px;}
.gnavitem                        {padding-right: 8px;}
.gnavlink                        {font-family: verdana; font-size: 10px; color:
#ffffff;}
.gnavitemsel                     {padding-right: 8px;}
.gnavlinksel                     {font-family: verdana; font-size: 10px; color:
#ffffff; text-decoration: none;}
.gnavL                           { }
.gnavR                           { }
.gnavT                           { }
.gnavB                           { }
A.gnavlink:visited {font-family: verdana; font-size: 11px; color:
#ffffff;}
A.gnavlink:hover {font-family: verdana; font-size: 11px; color:
#ffffff;}
A.gnavlinksel:visited (font-family: verdana; font-size: 11px; color:
#ffffff;}
A.gnavlinksel:hover (font-family: verdana; font-size: 11px; color:
#ffffff;}
/* primary nav */
.pnav                            {margin: 3px;}
.pnavitem                        {padding: 4px 8px;}
.pnavitemsel                     {padding: 3px 7px; border: solid 1px #ffffff;}
.pnavlink                        {font-family: verdana; font-size: 10px; font-
weight: bold; color: #ffffff; text-decoration: none; text-transform:
uppercase;}
.pnavlinksel                     {font-family: verdana; font-size: 10px; font-
weight: bold; color: #ffffff; text-decoration: none; text-transform:
uppercase;}
.pnavL                           {width: 6px;}
.pnavR                           { }
.pnavT                           { }
.pnavB                           { }
A.pnavlink:visited {font-family: verdana; font-size: 10px; font-
weight: bold; color: #ffffff; text-decoration: none; text-transform:
none;}
A.pnavlinksel:visited (font-family: verdana; font-size: 10px; font-
weight: bold; color: #ffffff; text-decoration: none; text-transform:
none;}
A.pnavlink:hover (font-family: verdana; font-size: 10px; font-weight:
bold; color: #ffffff; text-decoration: none; text-transform: none;}
A.pnavlinksel:hover (font-family: verdana; font-size: 10px; font-
weight: bold; color: #ffffff; text-decoration: none; text-transform:
none;}
/* secondary nav */
.snav                            { }
.snavitem                        {padding: 2px 12px;}
.snavitemsel                     {padding: 2px 12px;}
.snavlink                        {font-family: verdana; font-size: 10px; font-
weight: bold; color: #ffffcc; text-decoration:none;}
.snavlinksel                     {font-family: verdana; font-size: 10px; font-
weight: bold; color: #ffffff; text-decoration:none;}
.snavL                           { }
.snavR                           { }
.snavT                           { }
.snavB                           { }
A. snavlink:visited              (font-family: verdana; font-size:
10px; font-weight: bold; color: #ffffcc; text-decoration:none;}
A.snavlinksel:visited            {font-family: verdana; font-size:
10px; font-weight: bold; color: #ffffff; text-decoration:none;}
A.snavlink:hover (font-family: verdana; font-size: 10px; font-weight:
bold; color: #ffffcc; text-decoration:none;}
A.snavlinksel:hover              {font-family: verdana; font-size:
10px; font-weight: bold; color: #ffffff; text-decoration:none;}
/*** CONTENT ***/
HR                               {color: #336666; height: 1px;}
A                                {color: #669999;}
A:hover       {color: #999966;}
A:visited     {color: #336666;}
div                              {font-family: verdana; font-size: 12px;}
p                                {font-family: verdana; font-size: 12px;}
td                               {font-family: verdana; font-size: 12px;}
th                               {font-family: verdana; font-size: 12px;}
/* content */
.contentTable {margin-top: 15px;}
.headerRow    { }
.header       {font-family: verdana; font-size: 13px; color: #669999;
font-weight: bold; border: solid 1px #669999; text-transform:
lowercase; padding: 2px 5px; background-color: #ffffff;}
.more         {font-size: 10px; color: #999966;}
A.more:visited {font-size: 10px; color: #999966;}
.descRow      { }
.desc         (font-family: verdana; font-size: 12px; padding-top:
10px;}
.colheadRow   { }
.colhead      {padding-right: 10px; color: #999966;}
.subheadRow   { }
.subhead      {font-family: verdana; font-size: medium; color:
#669999;}
.dataRow      { }
.datarowOdd   {background-color: #dddddd;}
.datarowEven  {background-color: #ffffff;}
.subtotalRow  {line-height: 30px;}
.totalRow     {line-height: 50px;}
.spacerRow    {height: 15px;}
.spacer                          { }
.closerRow    { }
.tcloser      { }
.mspacer      {margin-top: 25px;}
/* datatypes */
.neutral      {font-family: verdana; font-size: 12px; padding-right:
10px;}
.positive     {font-family: verdana; font-size: 12px; padding-right:
10px;}
.negative     {font-family: verdana; font-size: 12px; padding-right:
10px;}
.moveUp       {font-family: verdana; font-size: 12px;
padding-right: 10px; color: #009900;}
.moveDown     {font-family: verdana; font-size: 12px; padding-right:
10px; color: #cc0000;}
.moveUnch     {font-family: verdana; font-size: 12px; padding-right:
10px;}
/* buttons */
.button       {margin-right: 10px; margin-top: 4px; font-family:
verdana; font-size: 10px; font-weight: normal; background-color:
#ffffff; color: #669999; border: 1px solid #999966;}
.btnFixed     {margin-right: 10px; margin-top: 4px; width: 80px; font-
family: verdana; font-size: 10px; font-weight: normal; background-
color: #ffffff; color: #669999; border: 1px solid #999966;}
.btnGo        {margin: 4px 10px 0px 0px; padding-bottom:
2px; font-family: verdana; font-size: 10px; font-weight: normal;
```

-continued

```
background-color: #ffffff; color: #669999; border: 1px solid
#999966;}
```

Figure 14:
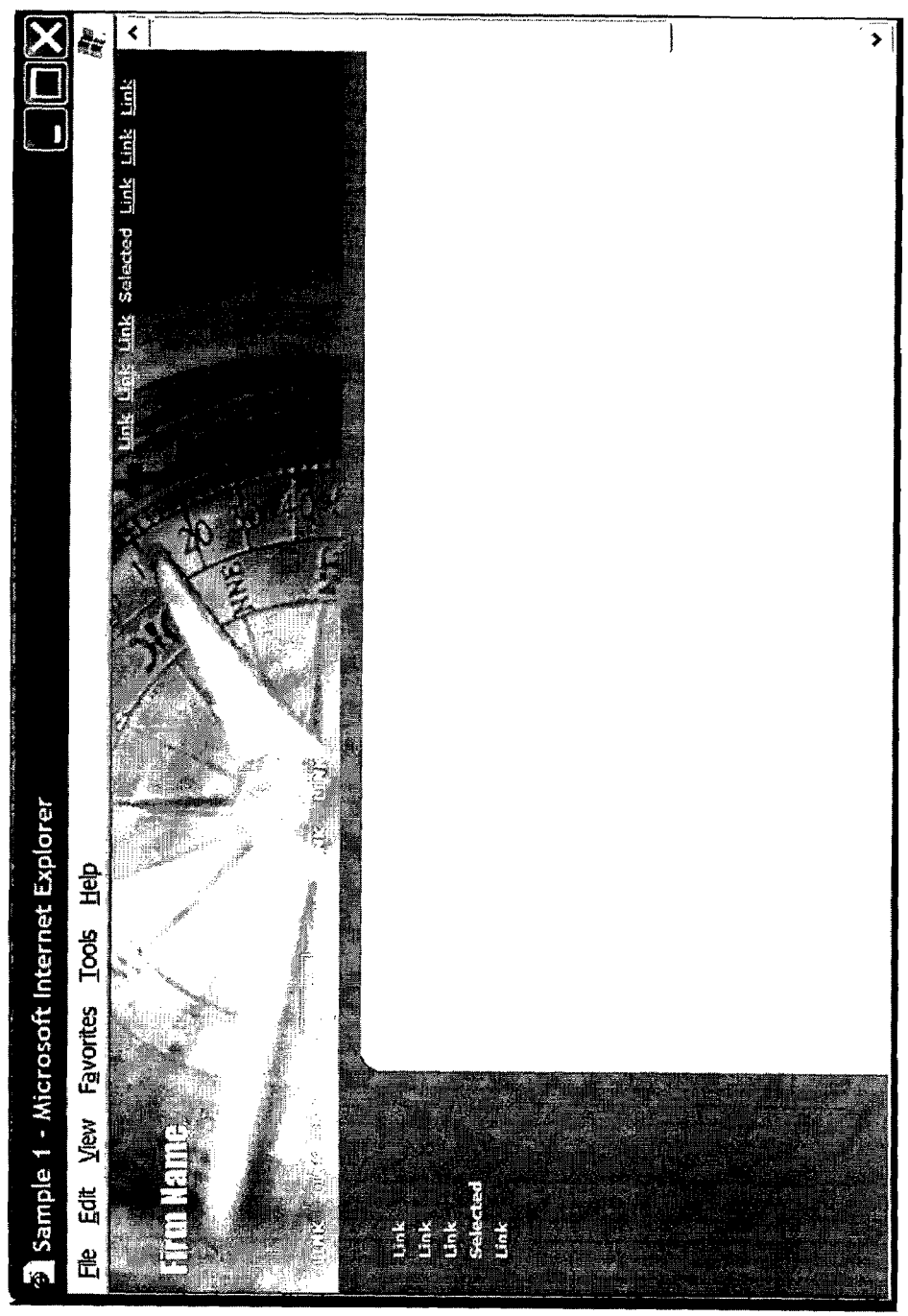
FIGS. 14-17 are screenshots of sample Cascading Style Sheet style definitions and attribute settings applied to a framework and to various navigation modules and content modules inserted into the framework code sample in accordance with an illustrative embodiment of the invention.

FIG. 14 is a screen shot of a web page produced by inserting a horizontal navigation module (for global navigation) 400 into skR1 806 of the framework 206, inserting a horizontal navigation module (for primary navigation) 400 into skR4 812, and inserting a vertical navigation module (for secondary navigation) 500 into container skR7*b* 818. The following sample code shows these types of modules inserted into such a framework 206.

```
<!DOCTYPE HTML PUBLIC "-//W3C//DTD HTML 4.01
Transitional//EN"
"http://www.w3.org/TR/html4/loose.dtd">
<html>
<head>
    <title>Sample 1</title>
    <link rel="stylesheet" type="text/css" href="style.css" />
</head>
<body>
<table border="0" cellpadding="0" cellspacing="0" width="100%"
id="topTable">
    <tr>
        <td valign="top" id="skR1">
            <!-- global nav -->
            <div class="gnav">
                <table border="0" cellpadding="0" cellspacing="0">
                    <tr>
                        <td class="gnavL"><img src="images/spacer.gif"
width="1" height="1" border="0"></td>
                        <td><div class="gnavitem"><a href="link.html"
class="gnavlink">Link</a></div></td>
                        <td><div class="gnavitem"><a href="link.html"
class="gnavlink">Link</a></div></td>
                        <td><div class="gnavitem"><a href="link.html"
class="gnavlink">Link</a></div></td>
                        <td><div class="gnavitemsel"><a href="link.html"
class="gnavlinksel">Selected</a></div></td>
                        <td><div class="gnavitem"><a href="link.html"
class="gnavlink">Link</a></div></td>
                        <td><div class=gnavitem><a href="link.html"
class="gnavlink">Link</a></div></td>
                        <td><div class="gnavitem"><a href="link.html"
class="gnavlink">Link</a></div></td>
                        <td class="gnavR"><img src="images/spacer.gif"
width="1" height="1" border="0"></td>
                    </tr>
                </table>
            </div>
            <!-- end global nav -->
        </td>
    </tr>
    <tr>
        <td valign="top" id="skR2">
            <div id="logo">
                <a href="url.html" class="logoLink">Firm Name</a>
            </div>
        </td>
    </tr>
    <tr>
        <td valign="top" id="skR3">
            <img src="images/spacer.gif" width="1" height="1"
border="0" />
        </td>
    </tr>
    <tr>
        <td valign="middle" id="skR4">
            <!-- primary nav -->
            <div class=pnav>
                <table border="0" cellpadding="0" cellspacing="0">
                    <tr>
                        <td class="pnavL"><img src ="images/spacer.gif"
width="1" height="1" border="0"></td>
                        <td><div class="pnavitem"><a href="link.html"
class="pnavlink">Link</a></div></td>
                        <td><div class="pnavitem"><a href="link.html"
class="pnavlink">Link</a></div></td>
                        <td><div class="pnavitem"><a href="link.html"
class="pnavlink">Link</a></div></td>
                        <td><div class="pnavitemsel"><a href="link.html"
class="pnavlinksel">Selected</a></div></td>
                        <td><div class="pnavitem"><a href="link.html"
class="pnavlink">Link</a></div></td>
                        <td><div class="pnavitem"><a href="link.html"
class="pnavlink">Link</a></div></td>
                        <td><div class="pnavitem"><a href="link.html"
class="pnavlink">Link</a></div></td>
                        <td class="pnavR"><img src="images/spacer.gif"
width="1" height="1" border="0"></td>
                    </tr>
                </table>
            </div>
            <!-- end primary nav -->
        </td>
    </tr>
    <tr>
        <td valign="top" id="skR5">
            <img src="images/spacer.gif" width"1" height="1" border="0" />
        </td>
    </tr>
</table>
<table border="0" cellpadding="0" cellspacing="0" width="100%"
id="mainTable">
    <tr>
        <td valign="top" id="skR6a"><div class="widthA"><img
src="images/spacer.gif" width="1" height="1" border="0" /></div></td>
        <td valign="top" id="skR6b"><div class="widthB"><img
src="images/spacer.gif" width="1" height="1" border="0" /></div></td>
        <td valign="top" id="skR6c"><div class="widthC"><img
src="images/spacer.gif" width="1" height="1" border="0" /></div></td>
        <td valign="top" id="skR6d"><div class="widthD"><img
src="images/spacer.gif" width="1" height="1" border="0" /></div></td>
        <td valign="top" id="skR6e"><div class="widthE"><img
src="images/spacer.gif" width="1" height="1" border="0" /></div></td>
    </tr>
    <tr>
        <td valign="top" id="skR7a"><div class="widthA"><img
src="images/spacer.gif" width="1" height="1" border="0" /></div></td>
        <td valign="top" id="skR7b"><div class="widthB"><img
src="images/spacer.gif" width="1" height="1" border="0" /></div>
            <!-- secondary nav -->
            <div class="snav">
                <div class="snavT"><img src="images/spacer.gif" width="1"
height="1" border="0"></div>
                <div class="snavitem"><a class="snavlink"
href="link.html">Link</a></div>
                <div class="snavitem"><a class="snavlink"
href="link.html">Link</a></div>
                <div class="snavitem"><a class="snavlink"
href="link.html">Link</a></div>
                <div class="snavitemsel"><a class="snavlinksel"
href="link.html">Selected</a></div>
                <div class="snavitem"><a class="snavlink"
href="link.html">Link</a></div>
                <div class="snavB"><img src="images/spacer.gif" width="1"
height="1" border="0"></div>
            </div>
            <!-- end secondary nav -->
        </td>
        <td valign="top" id="skR7c"><div class="widthC"><img
src="images/spacer.gif" width="1" height="1" border="0" /></div></td>
        <td valign="top" id="skR7d"><div class="widthD"><img
src="images/spacer.gif" width="1" height="1" border="0" /></div></td>
        <td valign="top" id="skR7e"><div class="widthE"><img
src="images/spacer.gif" width="1" height="1" border="0" /></div></td>
    </tr>
    <tr>
        <td valign="top" id="skR8a"><div class="widthA"><img
src="images/spacer.gif" width="1" height="1" border="0"/></div></td>
        <td valign="top" id="skR8b"><div class="widthB"><img
src="images/spacer.gif" width="1" height="1" border="0" /></div></td>
```

```
            <td valign="top" id="skR8c"><div class="widthC"><img
src="images/spacer.gif" width="1" height="1" border="0" /></div></td>
            <td valign="top" id="skR8d"><div class="widthD"><img
src="images/spacer.gif" width="1" height="1" border="0" /></div></td>
            <td valign="top" id="skR8e"><div class="widthE"><img
src="images/spacer.gif" width="1" height="1" border="0" /></div></td>
        </tr>
    </table>
</body>
</html>
```

Figure 15:
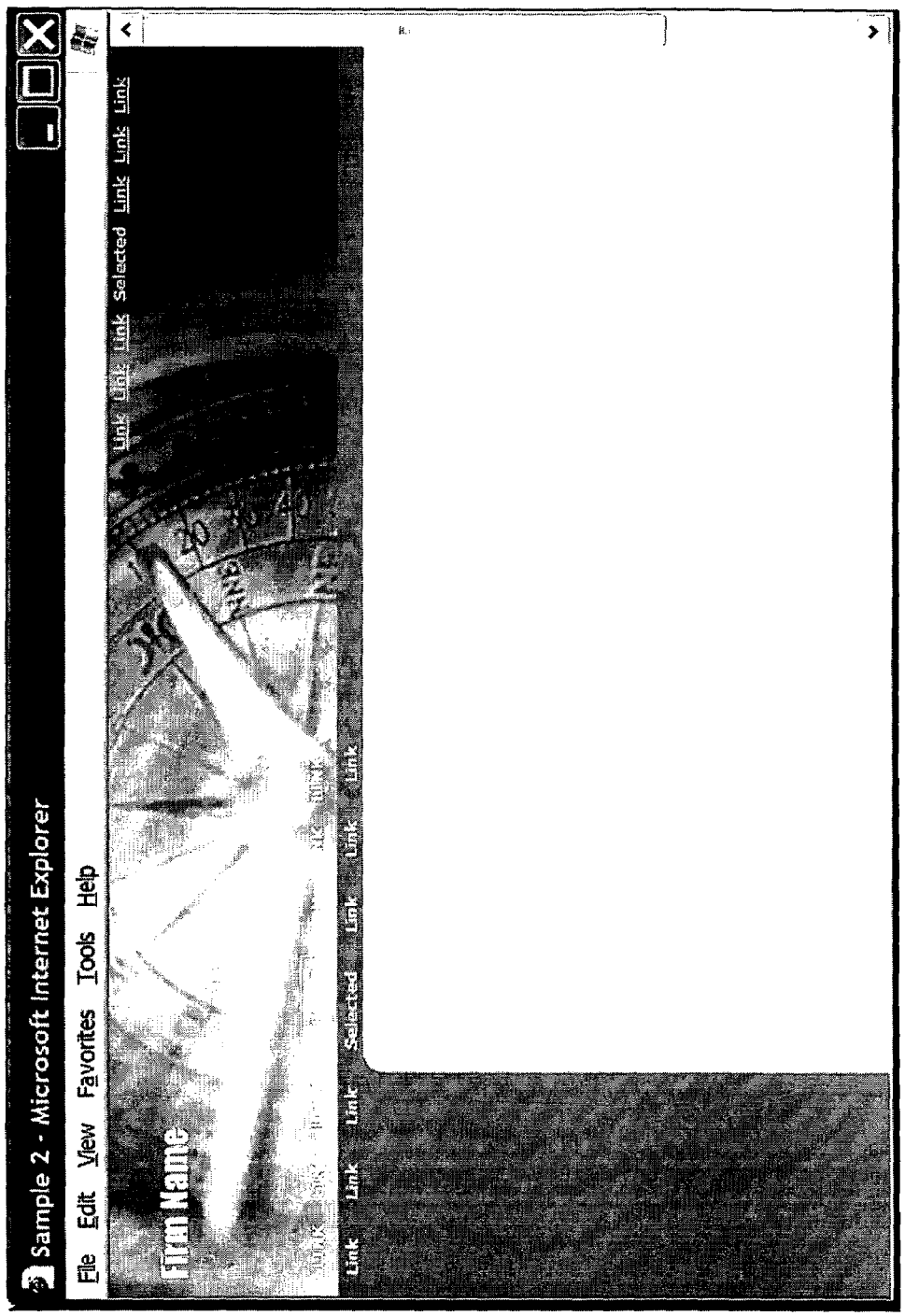

FIG. 15 is a screen shot of a web page produced by inserting a horizontal navigation module (for global navigation) 400 into skR1 806 of framework 206, inserting a horizontal navigation module (for primary navigation) 400 into skR4 812, and inserting a horizontal navigation module (for secondary navigation) 400 into skR5 814.

Figure 16:
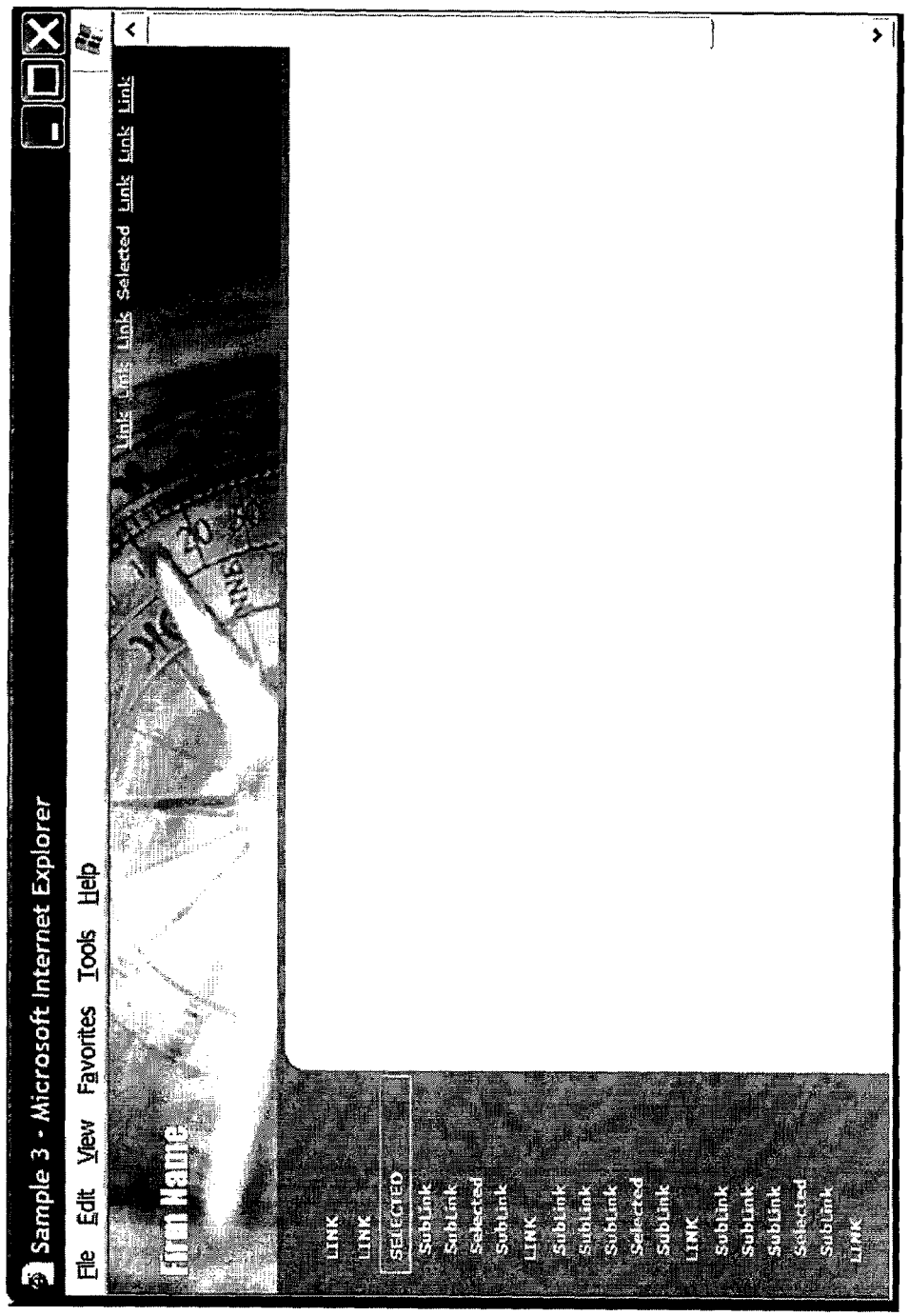

FIG. 16 is a screen shot of a web page produced by inserting a horizontal navigation module (for global navigation) 400 into skR1 806 of framework 206, inserting a multilevel, also referred to as nested, vertical navigation module (for combined primary/secondary navigation) 500 into container skR7b 818.

Figure 17:
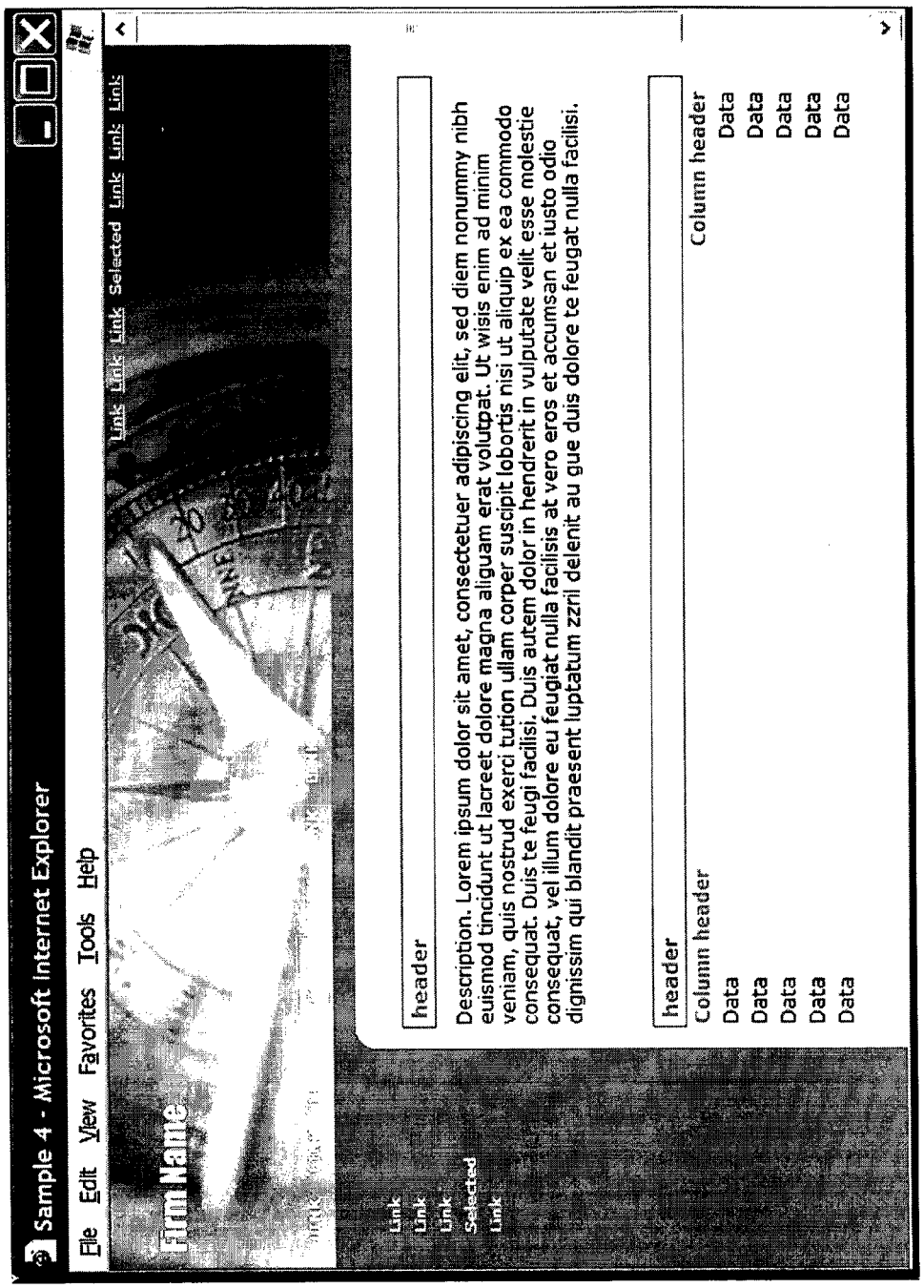

FIG. 17 is a screen shot of a web page produced in a manner similar to the screen shot of FIG. 15. In addition to the code for producing FIG. 15, FIG. 17 has two examples of content modules inserted into container skR7d 822.

VII. Defining Module Components that Provide a Relatively Wide Range of User Interface Looks Content-module components and/or navigation-module components may be defined and/or identified for inclusion in the content and navigation modules in order to provide a capability to provide a relatively wide range of looks. This may be done by comparing the similarities and differences between the existing user interfaces (including Web sites) and any desired additional visual characteristics. Once the common components are identified, a generic component type may be defined for containing particular instances of the generic component type. For instance, a header is a generic type of content-module component. In FIG. 9, headers 902-1 through 902-5 are particular instances of headers. These headers contain different text and are headers for different types of modules, such as a content module with text, a summary table, a chart, a multi-column table, and a news module. But, because they are each headers, formatting specification 208 applicable to headers is applied to each of these particular instances of headers.

To enable the mimicking of the Web-site style of existing Web sites in a particular subject area, such as financial Web sites, or Web sites for medical, accounting, or law-firm practices, for instance, the various types of layouts and content present on the existing Web sites may be surveyed to determine what types of components should be included in navigation modules 202 and content modules 204 in order to be able to represent the existing Web sites.

When comparing the Web-site style of existing Web sites to be mimicked, some similarities may be readily apparent. Then, a next level of abstraction may also be considered. For instance, although navigation links are laid out horizontally near the top of three different sites to be mimicked, the navigation links may have different visual characteristics. Suppose, one site shows navigation links as buttons, a different site shows them as tabs, and another site shows them simply as straight links. Then, at least these three types of visual characteristics may be supported via a generic navigation-module component and formatting specification 208 in accordance with various inventive principles.

As another example, suppose one site has horizontal navigation tabs across the top of the site and another site has navigation buttons vertically down the left side of the site. And suppose the horizontal tabs and the vertical buttons provide similar functionality. The tabs and buttons may look different and they may be laid out differently, but they may be categorized into the same generic navigation-module component as one another. In this way, parts of pages may be modularized as generically equivalent to one another. But other types of navigation links, such as a link near a Copyright notice at the bottom of a page, may also be present on a page. Because this type of link lacks equivalence with the tabs and buttons, a separate module may be defined to accommodate such a link at the bottom of a page.

This type of comparison of similarities and differences and modularization of components of various pages may continue iteratively until substantially all of the types of elements to be displayed on a page are categorized into generic modules and generic module components.

In addition to mimicking existing Web sites, modules and/or module components may be defined for providing additional visual characteristics that may not correspond to any existing Web-site style to be mimicked. By controlling colors, fonts, sizes of things, and the like, features not present on existing sites may also be provided. If working with an embodiment of the invention that is shared amongst various authors and systems, versioning mechanisms can be employed to allow new styles to be added. Defaults for new styles can be provided, potentially derived from previously defined styles (e.g. color).

A determination may be made regarding which visual characteristics may be applied to a particular component, such as a header, of a module. For instance, for headers, visual-characteristic options may include: the font, the color of the font, whether it's bold or italics, whether there's a graphic as part of the header, and the like. During this design phase, the visual characteristics themselves of headers are not being defined. Instead, containers are being defined that will accommodate items for specifying the visual characteristics of headers.

VII. Concluding Remarks

What has been described above is merely illustrative of the application of the principles of the invention. Those skilled in the art can implement other arrangements and methods without departing from the spirit and scope of the present invention. Any of the methods of the invention can be implemented in software that can be stored on computer disks or other computer-readable media.

We claim:

1. A system for simplified implementation of adaptable user interfaces in a computing device using one or more processors, the system comprising:
   at least one content module that contains content, wherein the content is unformatted with respect to visual characteristics;
   at least one navigation module;
   a framework supporting the simplified implementation, the framework being visually modified by formatting attributes of cascading style sheets and content including a plurality of framework containers each defining at least one of a plurality of formatting attributes at a data-level;
the plurality of formatting attributes being activated by the at least one content module to instantiate an application-level relationship of the at least one content module that contains content including a plurality of containers configured to accept zero or more modules or containers, wherein the at least one content module and the at least one navigation module are inserted into the plurality of framework containers; and
a formatting specification that includes a standardized set of flexible styles, attributes of which are set for defining a plurality of visual characteristics of the at least one content module and, the at least one navigation module with the visual characteristics instantiating and displaying at least a portion of the framework after at least one content module is inserted into the framework, wherein if one of said plurality of containers does not contain a module or another container after creating an instance of the at least one navigation module that associates the same data type between the data-level and the application-level, the container shrinks thereby effectively disappearing from the instantiated framework when the user interface is displayed.

2. The system of claim 1, wherein at least one of said plurality of containers includes at least one row that includes at least one column.

3. The system of claim 1, wherein when a content module or navigation module is inserted into one of said plurality of containers, the container expands to fit the inserted content module or the inserted navigation module.

4. The system of claim 1, wherein the plurality of visual characteristics are selected from: colors, heights, widths, spacing around an element, spacing within an element, background images, borders, and fonts.

5. A web-page user interface generated by the system of claim 1.

6. The system of claim 1, wherein if one of said plurality of containers does not contain a module or another container after the dynamically linking between the data-level and the application-level the container shrinks thereby from the instantiated framework when the user interface is displayed.

7. A method of providing at least one adaptable user interface in a computing device using one or more processors, the method comprising:
providing a framework supporting the at least one adaptable user interface, the framework being visually modified by formatting attributes and content including,
creating a plurality of framework containers with the computing device to form the framework, the framework containers each defining at least one of the plurality of formatting attributes of cascading style sheets at a data-level;
activating the plurality of formatting attributes by at least one content module to instantiate an application-level relationship of the at least one content module that contains content including a plurality of containers configured to accept zero or more modules or containers;
inserting at least a first content module unformatted with respect to visual characteristics into one of said plurality of containers;
inserting at least a first navigation module into one of said plurality of containers;
defining, by setting a first set of attributes of a standardized set of styles, a first plurality of visual characteristics of at least a portion of each of the first content module, the first navigation module, and the plurality of framework containers; and
combining the plurality of framework containers, including the first content module and the first navigation module, with the visual characteristics instantiating and displaying at least a portion of the framework after at least one content module is inserted into the framework with the attributes of the standardized set of styles to render a first user interface, wherein if one of said plurality of containers does not contain a module or another container, after creating an instance of the at least one navigation module that associates the same data type between the data-level and the application-level, the container shrinks thereby effectively disappearing from the framework when the rendered user interface is displayed.

8. The method of claim 7, wherein the first user interface is made to match the appearance of a first Web site.

9. The method of claim 7, further comprising:
defining, by setting a second set of attributes of the standardized set of styles, a second plurality of visual characteristics of at least a portion of at least one of the first content module, the first navigation module, and the instantiated framework; and
combining the framework, including at least one of the first content module and the first navigation module, that change at least a portion of the instantiated framework when inserted into the instantiated framework with the second plurality of visual characteristics to render a second user interface that has a different appearance than the first user interface.

10. The method of claim 7, further comprising:
inserting at least one of at least a second content module and at least a second navigation module into one of said plurality of containers in the instantiated framework;
defining, by setting a second set of attributes for the standardized set of styles, a second plurality of visual characteristics of at least a portion of each of the second content module, the second navigation module, and the instantiated framework; and
combining the instantiated framework, including at least one of the second content module and the second navigation module, that change at least a portion of the instantiated framework when inserted into the instantiated framework with the second plurality of visual characteristics to render a second user interface that has a different appearance than the first user interface.

11. The method of claim 10, wherein the first user-interface matches the appearance of a first Web site and the second user-interface matches the appearance of a second Web site.

12. The method of claim 7, wherein when at least one of a content module and a navigation module is inserted into one of said plurality of containers, the container expands to fit the inserted module.

13. The method of claim 7, wherein the plurality of visual characteristics are selected from: colors, heights, widths, spacing around an element, spacing within an element, background images, borders, and fonts.

14. A computer-readable medium containing computer-executable instructions for performing the method of claim 7.

15. A web-page user interface generated by the method of claim 7.

16. A computer-readable medium having computer-readable modules of a user interface in a computing device using one or more processors, the computer readable medium comprising:

at least one content module unformatted with respect to visual characteristics that contains content to be displayed via the user interface;

at least one navigation module;

a framework module supporting the user interface, the framework module is visually modified by formatting attributes and content including a plurality of framework modules each defining at least one of a plurality of formatting attributes of cascading style sheets at a data-level;

the plurality of formatting attributes being activated by the at least one content module to instantiate an application-level event of the at least one content module that contains content including a first table and a second table both having a plurality of containers configured to accept zero or more content or navigation modules, wherein the at least one navigation module is inserted into at least one of the containers of the first table and the at least one content module is inserted into at least one of the containers of the second table; and a standardized set of styles attributes of which are set to define a plurality of visual characteristics of at least a portion of each of: the at least one content module, the at least one navigation module, with the visual characteristics instantiating and displaying at least a portion of the framework after at least one content module is inserted into the plurality framework modules, wherein if one of said plurality of containers does not contain a content or navigation module after creating an instance of the at least one navigation module that associates the same data type between the data-level and the application-level, the container shrinks thereby effectively disappearing when the user interface is displayed.

17. The computer-readable medium of claim 16, wherein when a content module or navigation module is inserted into one of said plurality of containers, the container expands to fit the inserted content module or the inserted navigation module.

18. The computer-readable medium of claim 16, wherein the plurality of visual characteristics are selected from: colors, heights, widths, spacing around an element, spacing within an element, background images, borders, and fonts.

19. A flexible framework system for adaptable database relationships between at least one content module to support user interfaces in a computing device using one or more processors, the system comprising:

at least one navigational module;

a framework supporting adaptable database relationships between at least one content module unformatted with respect to visual characteristics, the framework being visually modified by formatting attributes and content including a plurality of framework containers each defining at least one of a plurality of formatting attributes of cascading style sheets at a data-level;

the plurality of formatting attributes are activated by the at least one content module to instantiate an application-level relationship of the at least one content module that contains content including a plurality of containers configured to accept zero or more modules or containers, wherein the at least one content module and the at least one navigation module are inserted into the framework and the content module that contains content is unformatted with respect to visual characteristics; and a formatting specification that includes a standardized set of flexible styles, attributes of which are set for defining a plurality of visual characteristics of the at least one content module, and the at least one navigation module said visual characteristics instantiating and displaying at least a portion of the framework after at least one content module is inserted into the plurality of framework containers, wherein if one of said plurality of containers does not contain a module or another container after creating an instance of the at least one navigation module that associate the same data type between the data-level and the application-level, the container shrinks thereby effectively disappearing from the instantiated framework when the user interface is displayed.

* * * * *